United States Patent
Tanaka et al.

(10) Patent No.: US 8,238,218 B2
(45) Date of Patent: *Aug. 7, 2012

(54) OPTICAL PICKUP, OPTICAL INFORMATION DEVICE, COMPUTER, OPTICAL DISK PLAYER, CAR NAVIGATION SYSTEM, OPTICAL DISK RECORDER, AND OPTICAL DISK SERVER

(75) Inventors: Toshiyasu Tanaka, Osaka (JP); Yoshiaki Komma, Osaka (JP); Kanji Wakabayashi, Kyoto (JP); Fumitomo Yamasaki, Nara (JP); Osamu Kajino, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/181,574

(22) Filed: Jul. 13, 2011

(65) Prior Publication Data

US 2011/0267934 A1    Nov. 3, 2011

Related U.S. Application Data

(63) Continuation of application No. 12/678,312, filed as application No. PCT/JP2008/002580 on Sep. 18, 2008, now Pat. No. 8,004,952.

(30) Foreign Application Priority Data

Sep. 19, 2007 (JP) .................................. 2007-241893

(51) Int. Cl.
*G11B 7/00* (2006.01)

(52) U.S. Cl. ..................................... 369/112.01; 369/120
(58) Field of Classification Search .................... None
See application file for complete search history.

(56) References Cited

FOREIGN PATENT DOCUMENTS

| JP | 03-113725 A | 5/1991 |
|---|---|---|
| JP | 09-282698 A | 10/1997 |
| JP | 2002-251776 A | 9/2002 |
| JP | 3447464 B2 | 7/2003 |
| JP | 2004-010759 A | 1/2004 |
| JP | 3663141 B2 | 4/2005 |

OTHER PUBLICATIONS

International Search Report for Application No. PCT/JP2008/002580, Dec. 16, 2008, Panasonic Corporation.

*Primary Examiner* — Paul Huber
(74) *Attorney, Agent, or Firm* — RatnerPrestia

(57) ABSTRACT

To provide an optical pickup and an optical information device, capable of obtaining excellent signal characteristics for an optical disk on and/or from which recording and/or reproducing are performed using a laser. The optical pickup includes an optical detector, a support holder for holding the optical detector, and an optical base for fixing the support holder. The support holder has at least two notches at its both ends, the optical base has convex portions corresponding to the notches of the support holder, the optical base and the support holder are fixed by photo-curable adhesives for bonding the convex portions and the support holder to each other, and the shortest distance between the side faces of the convex portions, which do not face each other, is equal to or less than the width of the support holder in the direction of right and left ends.

18 Claims, 22 Drawing Sheets

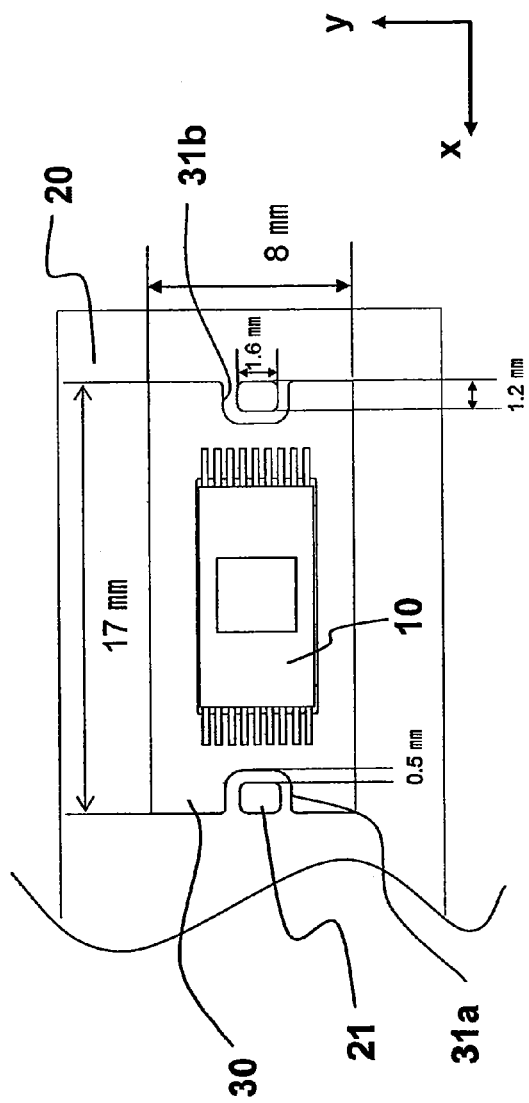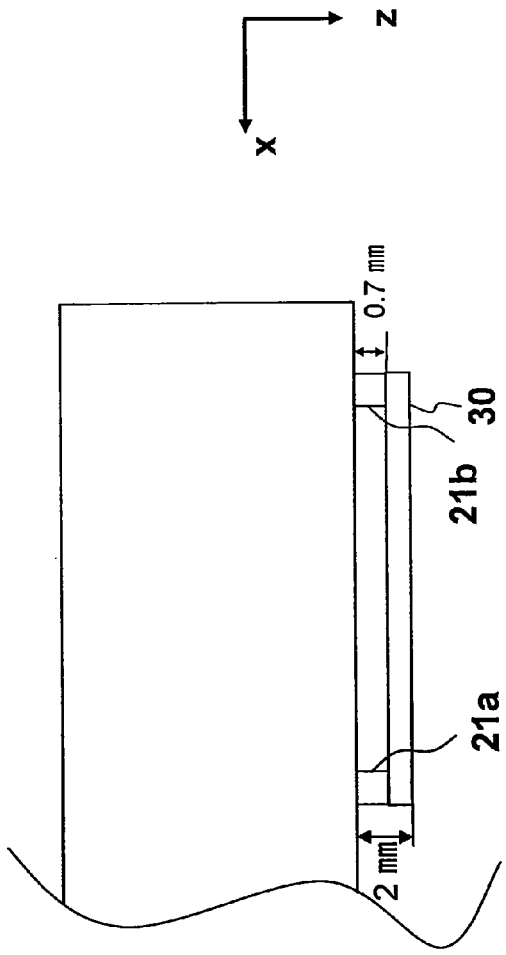
Fig.3 (a)
Fig.3 (b)

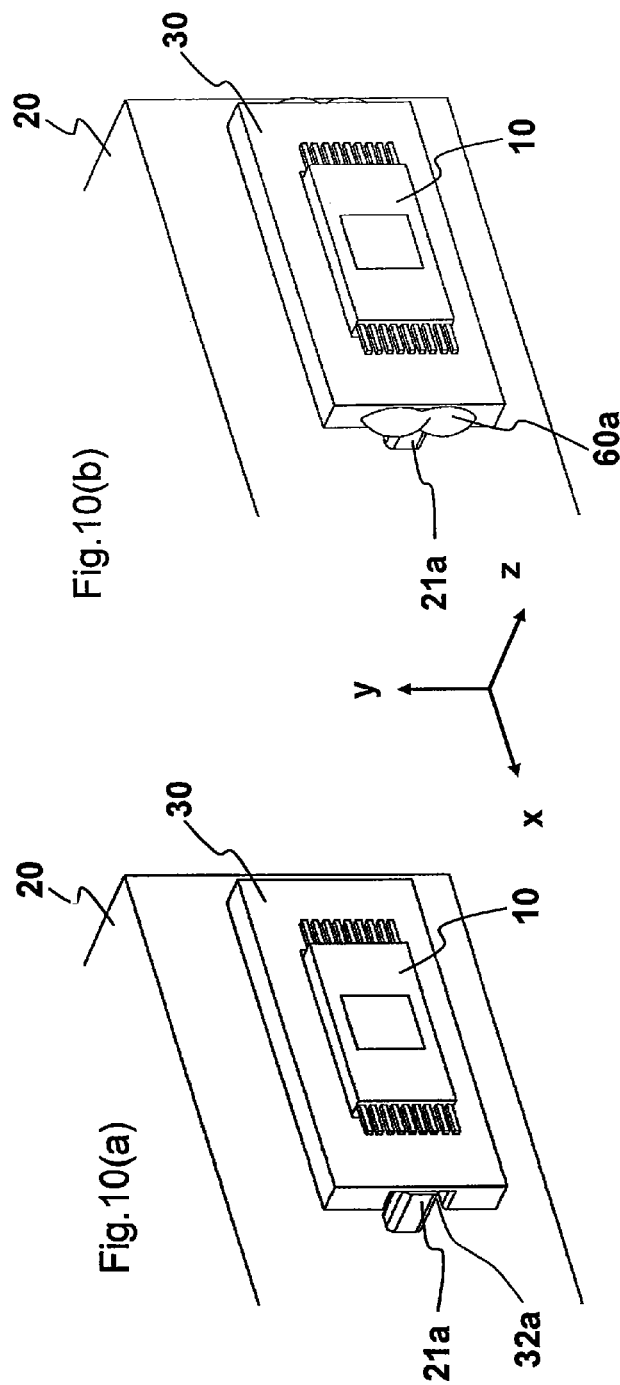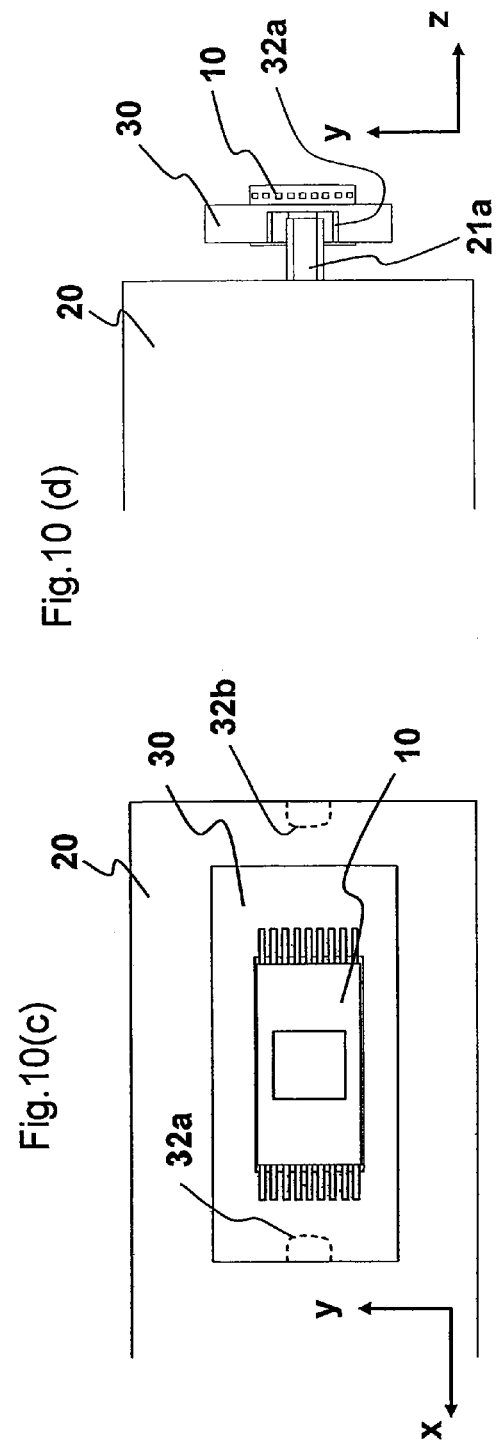

OPTICAL PICKUP, OPTICAL INFORMATION DEVICE, COMPUTER, OPTICAL DISK PLAYER, CAR NAVIGATION SYSTEM, OPTICAL DISK RECORDER, AND OPTICAL DISK SERVER

This application is a continuation of U.S. patent application Ser. No. 12/678,312, filed Mar. 16, 2010, which is incorporated herein by reference.

CROSS-REFERENCE TO RELATED APPLICATIONS

This application is a U.S. national phase application of PCT International Patent Application No. PCT/JP2008/002580 filed Sep. 18, 2008, claiming the benefit of priority of Japanese Patent Application No. 2007-241893 filed Sep. 19, 2007, all of which are incorporated by reference herein in their entirety.

TECHNICAL FIELD

The present invention relates to an optical pickup and optical information devices which have the optical pickup built therein, and irradiates an optical disk with light to perform recording and/or reproduction of information.

BACKGROUND ART

Although there are various recording media for recording and saving digital audio, images, animations, document files and data files which are created by computer, etc., there is an optical disk as one of the recording media. Especially, DVDs (Digital Versatile Disks) have a high density and large capacity as compared with conventional CDs (Compact Discs), and even in the field of picture recording machines, are spreading as media to replace the currently mainstream VTRs (Video Tape Recorders). Moreover, in recent years, BDs (Blu-ray Disks) that are a next-generation optical disk, which have further enhanced recording density using a blue semiconductor laser, are beginning to spread.

In order to increase the capacity of an optical disk, it is necessary to increase the recording density of information by making an optical spot formed by the light radiated to the optical disk smaller when information is recorded on the optical disk and when the information recorded on the optical disk is reproduced. The optical spot can be made smaller by shortening the wavelength of the laser beam of the light source and enlarging the numerical aperture (NA) of an objective lens. In DVDs, a light source with a wavelength of 660 nm and an objective lens with a numerical aperture (NA) of 0.6 are used. On the other hand, in BDs, a recording density of 5 times the recording density of DVDs is attained by using a blue laser with a wavelength of 405 nm and an objective lens of NA 0.85. Additionally, in these optical disks, in order to perform recording and reproducing of data, an optical information device is required.

Meanwhile, as one of the parts which constitute the optical pickup, there is an optical detector for receiving the reflected light from an optical disk to generate a control signal, a reproduction signal, etc. of the optical pickup. It is necessary to adjust and fix this optical detector to a specified position on an optical axis with high accuracy, and a higher accuracy of adjustment and fixation than the conventional technique is required for an optical pickup which performs recording/reproducing on a higher-density disk. In conventional optical pickups for DVDs and CDs, the method described below was used as a method of fixation and adjustment of the optical detector.

For example, in a method shown in Japanese Patent No. 3663141 as a conventional technique, as shown in FIG. 21, cut-in portions 221a and 221b are formed at both ends of a mounting plate 220 which supports an optical detector 210, convex portions 231a and 231b formed on an optical base 230 are inserted into the cut-in portions 221a and 221b of the mounting plate 220, respectively, and the mounting plate 220 is adjusted in a floating state on the air. After the adjustment is performed with high accuracy and the position is temporarily determined, the mounting plate 220 is fixed to an optical base 230, using photo-curable adhesives, such as UV curable resin.

Here, the convex portions 231a and 231b of the optical base 230 have shapes such that the convex portions stick out from both ends of the mounting base 220, and exposed surfaces of the convex portions 231a and 231b of the optical base 230 and the cut-in portions 221a and 221b of the mounting plate 220 are adhered to each other.

DISCLOSURE OF THE INVENTION

Problems to be Solved by the Invention

However, the present inventor has discovered that there are the following problems when the optical pickup fabricated by the above-described method is used for BDs.

FIG. 22 is a view showing a graph when characteristics of the optical pickup fabricated by the above conventional technique are evaluated by using changes in the value of the focus offset accompanying temporal changes.

As shown in FIG. 22, in an optical pickup in a state immediately after the fabrication, i.e., immediately after the adhesive between the mounting plate 220 and the optical base 230 was cured, a focus offset of about 0.12 μm occurred from the ideal offset state. Moreover, in order to investigate the storage durability of this optical pickup, when the optical pickup was stored and subjected to a progress experiment under a high temperature (about 70 to 80° C.), a low temperature (−40 to −30° C.), and a high humidity (a humidity of about 900), the focus offset further increased and occurred as much as about 0.24 μm.

It is believed that the cause of this focus offset is because deviation has occurred between the ideal position of the optical detector 210 and the actual arrangement position of the optical detector 210. When the position of the optical detector 210 was actually measured, a positional deviation of about 20 μm occurred.

Generally, if the focus offset amount exceeds 10% of a linear range, the servo becomes unstable and a reproduction signal deteriorates. Therefore, in the optical pickup, it is necessary to suppress the focus offset amount to the numeric value of 10%. In the case of DVDs, the spacing of the defocusing amount such that a defocusing detection range, i.e., a dynamic range (difference between the smallest and greatest of FE signal strength) in a focus error (FE) signal becomes the greatest is approximately 4 μm. Even if the focus offset change after long-term storage is a value of about 0.24 μm as shown in FIG. 22, this is merely an amount equivalent to 6% of the linear range of DVDs.

That is, the focus offset is maintained in a range which does not exceed an allowable value even when the optical pickup fabricated by the conventional method is used for DVDs. Therefore, in a case of reproducing from and/or recording on DVDs, there was no great influence on reproduction signal characteristics even if the above offset amount occurred.

However, in the case of high-density optical disks like BDs which perform reproducing and/or recording using a blue laser beam of shorter wavelength than that of the red laser used for DVDs, the defocusing detection range is approximately 2 μm which is narrower than that of DVDs.

Accordingly, in the optical pickup fabricated by the conventional method, in a case where the positional deviation after long-term storage of the optical detector 210 occurs as much as about 20 μm, this becomes an amount equivalent to about 12% of the defocusing detection range of BDs, and eventually exceeds the focus offset allowable value (10% or less with respect to the defocusing detection range) in BDs.

As described above, according to the conventional optical pickup, the present inventor has realized that it is necessary to take the positional deviation of the optical detector 210, which did not need to be taken into consideration in the case of DVDs, into consideration in the case of BDs. Moreover, the present inventor has studied the specification and solution of the cause of occurrence of positional deviation, as will be described later.

The present invention was made in view of such problems, and the object thereof is to provide an optical pickup and an optical information device using the optical pickup, capable of obtaining excellent signal characteristics for an optical disk on and/or from which recording and/or reproducing are performed using a laser.

Means for Solving the Problems

The $1^{st}$ aspect of the present invention is an optical pickup comprising:
an optical component;
a support holder for holding said optical component; and
an optical base for fixing said support holder,
wherein said support holder has at least one concave portion at its both ends, respectively,
said optical base has convex portions corresponding to said concave portions of said support holder,
said optical base and said support holder are fixed by photo-curable adhesives for adhering said convex portions and said support holder to each other, and
side faces of a pair of said convex portions are respectively arranged on the same planes as both said ends of said support holder, said side faces not facing each other, and
when the shortest distance between said side faces of said pair of said convex portions is defined as W, and a width of both said ends of said support holder in a direction of right and left ends is defined as X, relationship of $$X=W$$

is satisfied.

The $2^{nd}$ aspect of the present invention is the optical pickup according to the $1^{st}$ aspect of the present invention,
wherein said pair of said convex portions is a pair of prismatic members which protrudes vertically from said optical base,
said pair of side faces which do not face each other is a pair of parallel faces located outside among said faces of said prismatic members vertical to said optical base, and
said shortest distance is a distance between said pair of parallel faces.

The 3rd aspect of the present invention is the optical pickup according to the $1^{st}$ aspect of the present invention,
wherein application positions of said photo-curable adhesives are symmetrical to each other in a vertical direction and a horizontal direction about center of a light-receiving region of said optical component.

The 4th aspect of the present invention is the optical pickup according to the $1^{st}$ aspect of the present invention,
wherein said concave portions of said support holder form notches which pass through both surfaces of said support holder.

The 5th aspect of the present invention is the optical pickup according to the $1^{st}$ aspect of the present invention,
wherein said concave portions of said support holder are formed only in a surface side of said support holder which faces said convex portions.

The 6th aspect of the present invention is the optical pickup according to the 4th of 5th aspects of the present invention,
wherein a height of said convex portions is a height such that said convex portions do not protrude from said support holder in a direction of an optical axis of a beam which enters said optical component.

The 7th aspect of the present invention is the optical pickup according to the 6th aspect of the present invention,
wherein said convex portions are hidden inside an external shape of said support holder in a projection view seen from a drawing direction of said convex portion.

The 8th aspect of the present invention is the optical pickup according to the $1^{st}$ aspect of the present invention,
wherein said pair of said convex portions is a pair of columnar members which protrudes vertically from said optical base,
wherein said pair of side faces which do not face each other is a pair of opposed oblique faces or positively bent curved faces located outside among faces of said columnar members vertical to said optical base, and
said shortest distance is a distance between roots of said curved faces or oblique faces.

The 9th aspect of the present invention is the optical pickup according to the $1^{st}$ aspect of the present invention,
wherein said convex portions have grooves or banks provided along a drawing direction from said surface of said optical base.

The 10th aspect of the present invention is the optical pickup according to the $1^{st}$ aspect of the present invention,
wherein said convex portions are formed from a transparent material.

The 11th aspect of the present invention is the optical pickups according to the 10th aspect of the present invention,
wherein said faces of said concave portions which face said convex portions are subjected to reflecting processing.

The 12th aspect of the present invention is the optical pickup according to the $1^{st}$ aspect of the present invention,
wherein said adhesive has a viscosity of 20000 mPa·s or more in a gel state during non-curing.

The 13th aspect of the present invention is the optical pickup according to the $1^{st}$ aspect of the present invention,
wherein hardness of said adhesive after curing is equal to or greater than 60 and equal to or less than 90 in Shore D scales.

The 14th aspect of the present invention is the optical pickup according to the $1^{st}$ aspect of the present invention,
wherein said optical component is an optical detector which receives a light beam emitted from a light source and reflected by an optical disk.

The 15th aspect of the present invention is an optical information device comprising:
said optical pickup according to the $1^{st}$ aspect of the present invention, a motor which turns an optical disk, and an electric circuit which receives a signal obtained from said optical pickup, and controls or drives said motor and said optical pickup on said basis of said signal.

The 16th aspect of the present invention is a computer comprising:

the optical information device according to the 15th aspect of the present invention, an input device or input terminal for inputting information, an arithmetic device which performs calculation on said basis of information input from said input device or input terminal, or information reproduced from said optical information device, and an output device or output terminal for displaying or outputting said information input from said input device or input terminal, said information reproduced from said optical information device, or results calculated by said arithmetic device.

The 17th aspect of the present invention is an optical disk player comprising:

the optical information device according to the 15th aspect of the present invention, and a decoder from information to an image, which converts an information signal obtained from said optical information device into an image.

The 18th aspect of the present invention is a car navigation system comprising:

the optical information device according to the 15th aspect of the present invention, and a decoder from information to an image, which converts an information signal obtained from said optical information device into an image.

The 19th aspect of the present invention is an optical disk recorder comprising:

the optical information device according to the 15th aspect of the present invention, and an encoder from said image to information, which converts image information into information to be recorded by said optical information device.

The 20th aspect of the present invention is an optical disk server comprising:

the optical information device according to the 15th aspect of the present invention, and an input/output terminal which performs exchange of information with outside.

The 21st aspect of the present invention is an optical pickup comprising:

an optical component;

a support holder for holding said optical component; and an optical base for fixing said support holder, wherein said support holder has at least one concave portion at its both ends, respectively, said optical base has convex portions corresponding to said concave portions of said support holder, said optical base and said support holder are fixed by photo-curable adhesives for adhering said convex portions and said support holder to each other, and at least one of side faces of a pair of said convex portions is arranged at a position further inward than inside said end of said support holder, said side faces not facing each other, and when the shortest distance between said side faces of a pair of said convex portions is defined as W, said side faces not facing each other, a width of both said ends of said support holder in a direction of right and left ends is defined as X, and a distance capable of being adjusted in position along a direction of said width is defined as dx, relationship of $$X-W \geqq 2dx \qquad \text{(Expression 1)}$$

is satisfied, and said dx is equal to or less than 300 µm.

Another aspect of the invention is an optical pickup comprising:

an optical component;

a support holder for holding said optical component; and an optical base for fixing said support holder, wherein said support holder has at least one concave portion at its both ends, respectively, said optical base has convex portions corresponding to said concave portions of said support holder, said optical base and said support holder are fixed by photo-curable adhesives for adhering said convex portions and said support holder to each other, and the shortest distance between side faces of a pair of said convex portions is equal to or less than a width of said support holder in a direction of right and left ends, said side faces do not facing each other.

The $2^{nd}$ aspect of the invention is the pickup according to the above mentioned $1^{st}$ aspect of the invention, wherein said pair of said convex portions is a pair of prismatic members which protrudes vertically from said optical base, said pair of side faces which do not face each other is a pair of parallel faces located outside among said faces of said prismatic members vertical to said optical base, and said shortest distance is a distance between said pair of parallel faces.

The $3^{rd}$ aspect of the invention is the optical pickup according to the above mentioned $2^{nd}$ aspect of the invention, wherein (1) one of said side faces of said convex portion is arranged on the same plane as said end of said support holder or at a position locating further inward than said end, and the other of said side faces of said convex portion is arranged on the same plane as said end of said support holder or at a position locating further inward than said end, or (2) one of said side faces of said convex portion is arranged at a position locating further inward than said end of said support holder, and the other of said side faces of said convex portion is arranged on the same plane as said end of said support holder or at a position locating further outward than said end.

The $4^{th}$ aspect of the invention is the optical pickup according to the above mentioned $3^{rd}$ aspect of the invention, wherein one of said side faces of said convex portion is arranged on the same plane as said end of said support holder or at a position locating further inward than said end, and the other of said side faces of said convex portion is arranged on the same plane as said end of said support holder or at a position locating further inward than said end, and when said distance between said pair of parallel faces is defined as W, said width of said support holder in said direction of said right and left ends is defined as X, and said distance of said support holder capable of adjustment of positioning along said direction of said width is defined as dx, relationship of $$X-W \geqq 2dx \qquad \text{(Expression 1)}$$

is satisfied.

The $5^{th}$ aspect of the invention is the optical pickup according to the above mentioned $3^{rd}$ aspect of the invention, wherein when said distance between said pair of parallel faces is defined as W, said width of said support holder in said directions of said right and left ends is defined as X, and when, regarding respective gaps between said convex portions and said concave portions of said support holder when adjustment of positioning on said optical base is performed with said support holder held on the air, said spacing before said adjustment of a gap at one end of said support holder is defined as $dx_a$, and said spacing before said adjustment of a gap at said other end of said support holder is defined as $dx_b$, relationship of $$dx_a \leqq dx_b \quad \text{(Expression 2)}$$

and $$X-W \geqq 2dx_a \quad \text{(Expression 3)}$$

Is satisfied.

Advantage of the Invention

According to the present invention, excellent signal characteristics can be obtained for an optical disk on and/or from which recording and/or reproducing are performed using a laser.

BRIEF DESCRIPTION OF THE DRAWINGS

FIG. 3(a) is a view showing an example of dimensions of the peripheral configuration of the optical detector 10 of the optical pickup in Embodiment 1 of the present invention, and FIG. 3(b) is a view showing an example of dimensions of the peripheral configuration of the optical detector 10 of the optical pickup in Embodiment 1 of the present invention.

FIG. 10(a) is a view showing a peripheral configuration of an optical detector 10 of an optical pickup in Embodiment 2 of the present invention, FIG. 10(b) is a view showing the peripheral configuration of the optical detector 10 of the optical pickup in Embodiment 2 of the present invention, FIG. 10(c) is a view showing the peripheral configuration of the optical detector 10 of the optical pickup in Embodiment 2 of the present invention, and FIG. 10(d) is a view showing the peripheral configuration of the optical detector 10 of the optical pickup in Embodiment 2 of the present invention.

DESCRIPTION OF SYMBOLS

Figure 1:
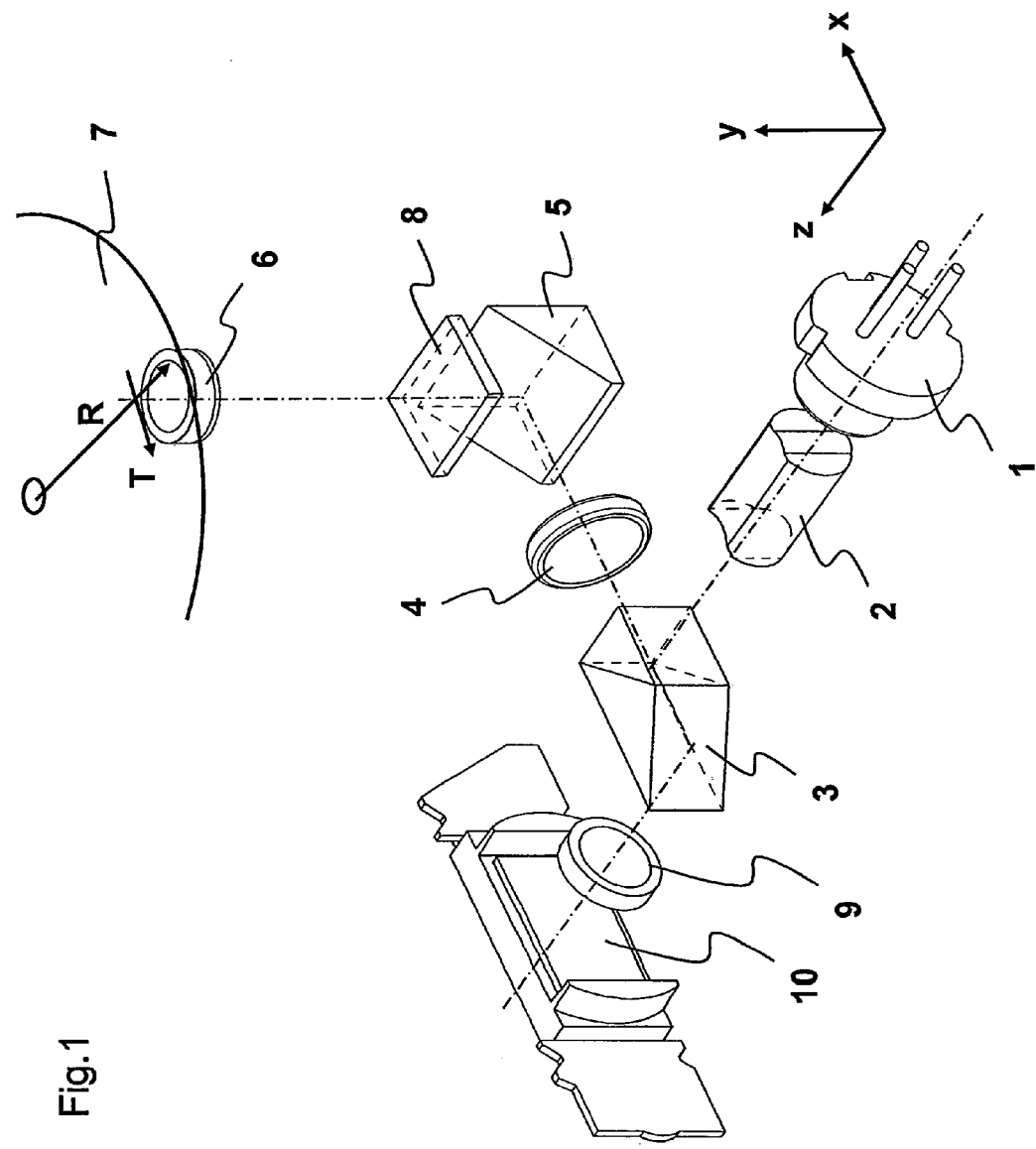
FIG. 1 is a view showing an optical configuration of an optical pickup in Embodiment 1 of the present invention.

1 laser light source
2 beam shaping element
3 beam splitter
4 collimating lens
5 rising mirror 6 condensing lens
7 optical disk
8 ¼ wavelength plate
9 detection lens
10 optical detector
11 circuit board
20 optical base
21a,21b convex portion
30 support holder
31a,31b notch
60a,60b adhesive
100 optical pickup
101 optical disk
102 turntable
103 clamper
104 motor
105 traverse
106 control circuit
107 optical disk drive
110 personal computer
111 optical disk drive
120 optical disk recorder
131 optical disk player
140 optical disk server
141 optical disk drive
144 network
150 car navigation system

BEST MODE FOR CARRYING OUT THE INVENTION

Hereinafter, embodiments of the present invention will be described with reference to the drawings.

Embodiment 1

An example of an optical system of an optical pickup in Embodiment 1 of the present invention is shown in FIG. 1. As for xyz axes shown in this drawing, the same reference numerals and directions are applied even in the subsequent drawings.

In FIG. 1, reference numeral 1 designates a laser light source which emits a laser beam of a wavelength λ, reference numeral 2 designates a beam shaping element which shapes a far-field pattern of the laser beam, reference numeral 3 designates a beam splitter which splits an optical path, reference numeral 4 designates a collimating lens, reference numeral 5 designates a rising mirror which bends an optical axis, reference numeral 6 designates a condensing lens (optical lens), and reference numeral 7 designates an optical disk with a base material thickness t1, in which recording/reproducing is performed by the light beam of the wavelength λ.

The laser light source 1 preferably uses a semiconductor laser light source, so that the size, weight, and power consumption of the optical pickup and an optical information device using this optical pickup can be reduced.

When the recording/reproducing of the optical disk 7 is performed, a blue light beam of a wavelength λ1 emitted from the laser light source 1 is shaped by the beam shaping element 2, is reflected by the beam splitter 3, and is made into substantially parallel beams by the collimating lens 4. Further, the optical axis is bent by the rising mirror 5, and the parallel beams are made into circularly-polarized light by a ¼ wavelength plate 8. Then, the circularly-polarized light is condensed on an information recording surface through a base material of the optical disk 7 with a thickness of 0.1 mm by a refractive condensing lens 6.

The blue light beam reflected by the information recording surface traces its original optical path reversely (return trip), is made into linearly-polarized light in a direction perpendicular to its initial direction by the ¼ wavelength plate 8, has a focal distance extended by the collimating lens 4, is transmitted through or reflected by the beam splitter 3, and enters the optical detector 10. By calculating the output of the optical detector 10, a servo signal and an information signal which are used for focus control or tracking control are obtained. As described above, as for the light beam of the wavelength λ, the beam splitter 3 is an optical path branch element with a polarized light separating film which totally reflects unidirectional linearly-polarized light, and totally transmits linearly-polarized light in a direction perpendicular thereto. These elements and holders (not shown) holding the elements are held on an optical base 20 (not shown).

Here, the optical detector 10 generally has a plurality of minute light-receiving regions. The reflected light from the optical disk 7 is propagated onto each light-receiving region to form a detection light spot, and the aforementioned information signal is obtained by detecting the quantity of light of the detection light spot and a modulation component superimposed on a beam. That is, it is important that a detection spot reaches a minute light-receiving region without deviation. Although elements which constitute the optical pickup are fixed on the optical base with high accuracy, it is extremely difficult to fix the elements without error. In addition, the semiconductor laser used for the laser light source 1 generally also has the positional error of a luminous point with respect to its housing. The optical detector itself also has the positional error of a light-receiving region with respect to its housing. Accordingly, the optical detector 10 requires adjustment of three axes of x, y, and z shown in FIG. 1, and should be fixed in a floated state on the air by holding the optical detector using a jig (not shown). Although it is also possible to use the adjustment axis of the optical detector itself as a substitute depending on optical configurations, for example, by adjusting the position of the laser light source 1 or adjusting the position of a detection spot on the optical detector 10 with high accuracy by the positional adjustment of a detection lens 9, a triaxial adjustment of the optical detector 10 itself has an advantage that an adverse optical effect, such as deterioration of wave aberration, does not occur.

However, as already described, even if the optical detector 10 is adjusted and fixed with high accuracy, the present inventor has discovered a problem in the optical pickup after manufacturing in that the positional deviation which is not negligible during the use of the BD may occur in the optical detector 10.

Thus, the cause of the positional deviation of the optical detector will be discussed before essential parts of the optical pickup of this embodiment 1 are described.

Figure 21:
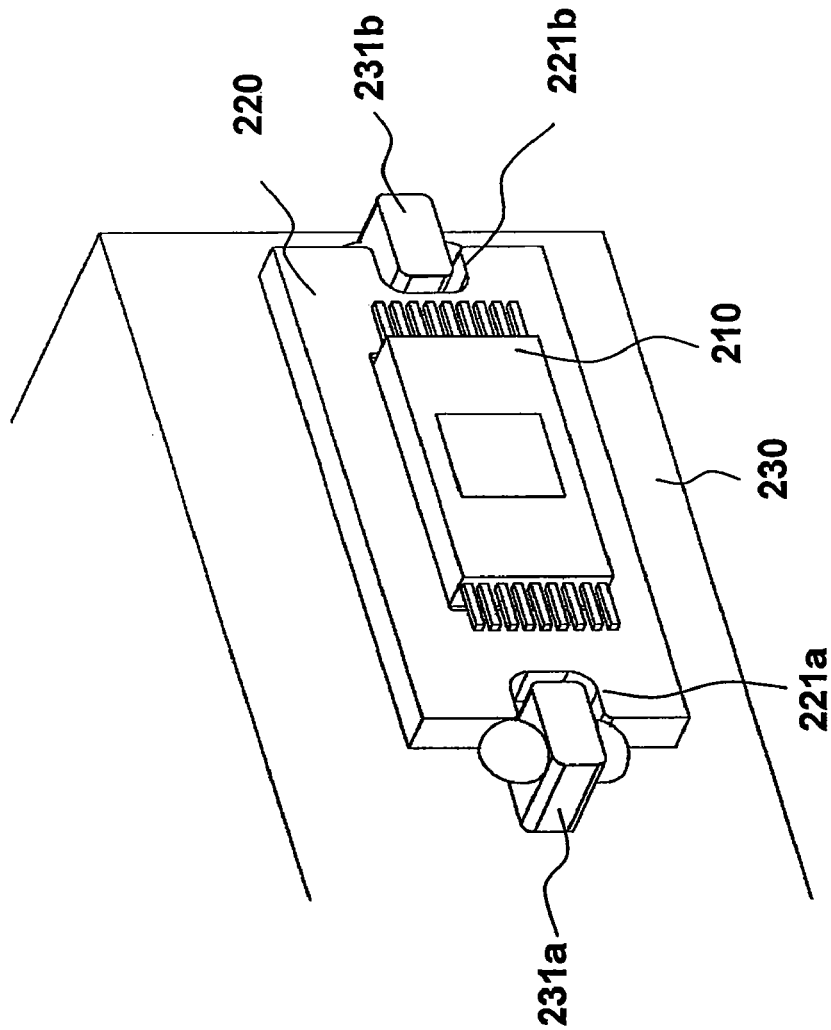
FIG. 21 is a view showing a configuration example of a conventional optical pickup.

In a case where the convex portions 231a and 231b of the optical base 230 have shapes such that the convex portions have stuck out from both ends of the mounting plate 220 as in the conventional technique shown in FIG. 21, it could be seen that the amount of positional deviation of the optical detector 210 changes depending on the direction of radiation of UV light to UV curable resin.

Figure 23:
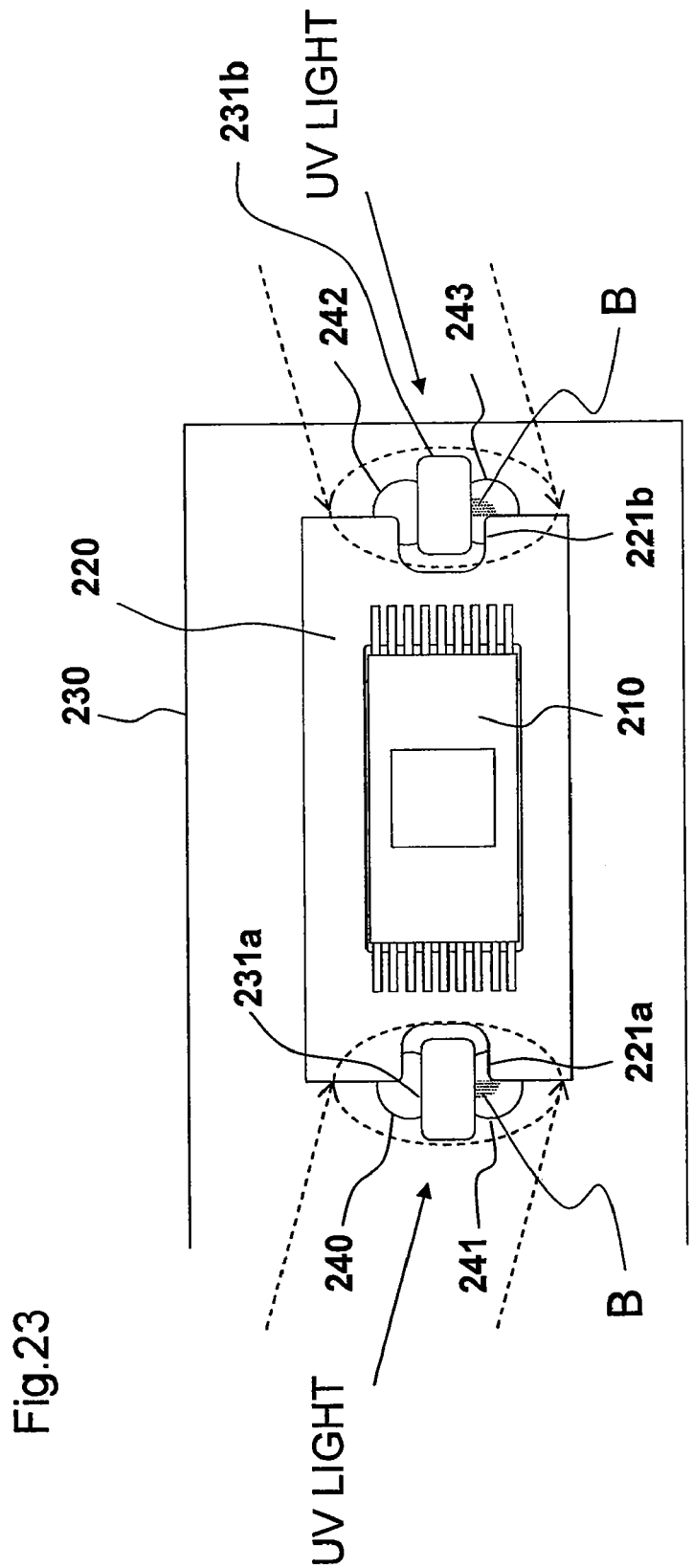
FIG. 23 is a view for explaining cause of positional deviation of an optical detector 210 in the conventional optical pickup.
Figure 24:
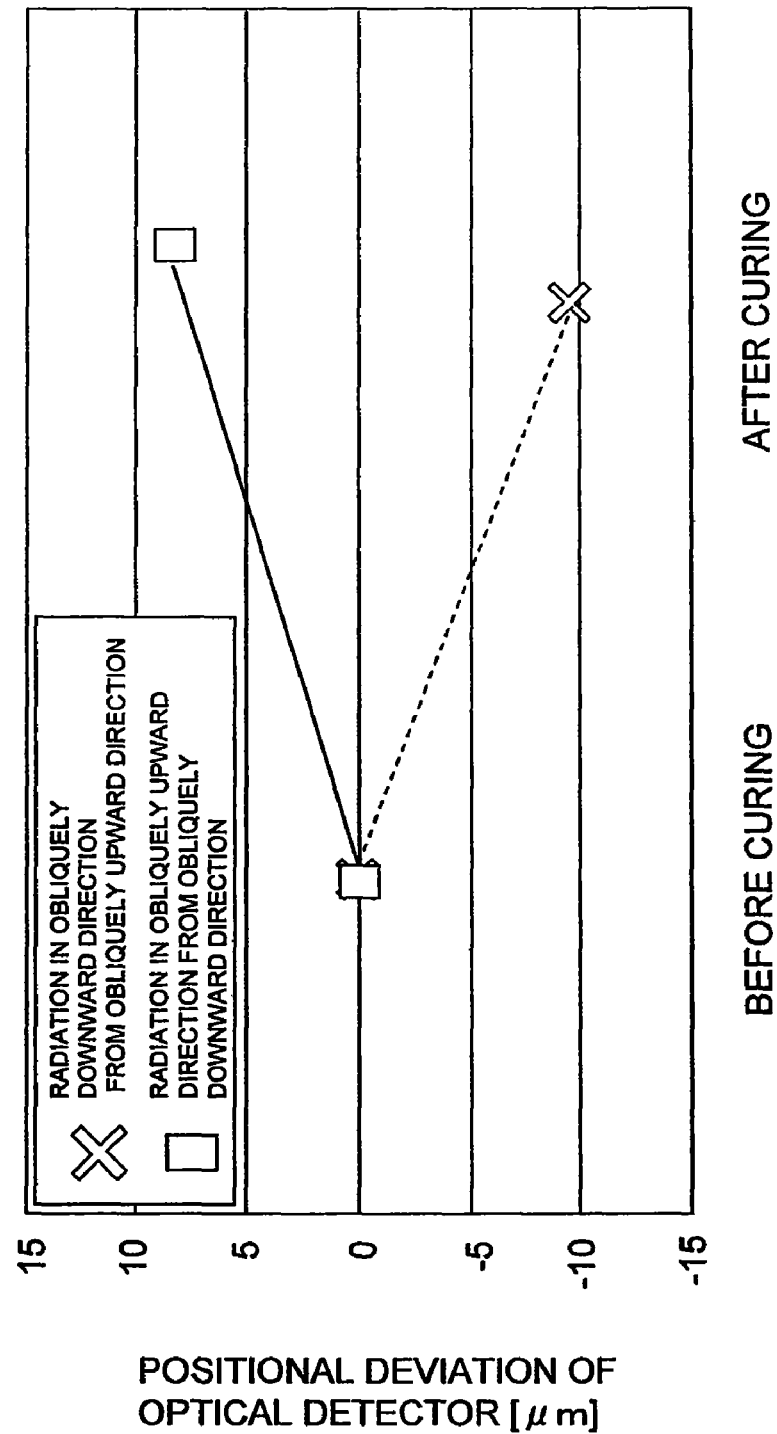
FIG. 24 is a view for explaining the positional deviation of the optical detector 210 in the conventional optical pickup.

That is, as shown in FIG. 23, if adhesive that is a UV curable resin is applied to four application points 240, 241, 242, and 243 between both side faces of each of the convex portions 231a and 231b of the optical base 230 and end faces of the mounting plate 220, an optical fiber of a UV light radiation instrument is arranged in the right and left directions to radiate UV light, thereby curing the adhesive, the optical detector 210 always deviated downward after the curing of the adhesive, as shown by a broken line in FIG. 24. As a result of having studied the structure of the optical fiber and the surroundings of the mounting plate 220 in detail, it was estimated that, since the optical fiber through which UV light is radiated deviated from a horizontal position, and the UV light was radiated in an obliquely downward direction from an obliquely upward direction, the upper adhesive might be cured early.

In order to demonstrate this estimation, the adhesive was cured such that the direction of the optical fiber was intentionally tilted upward and UV light was radiated in an obliquely upward direction from an obliquely downward direction. As a result, as shown by a solid line in FIG. 24, the optical detector 210 deviated upward as estimated.

As such, in the structure of the conventional example, it can be seen that, if the radiation position of UV light deviates even slightly from a horizontal position, the positional deviation of the optical detector may occur in either upward or downward direction.

It is believed that the reason why the amount of positional deviation of the optical detector 210 changes depending on the direction of radiation of UV is as follows. As in FIG. 21, in a case where the convex portions 231a and 231b of the optical base 230 have shapes such that the convex portions stick out outward from both ends of the mounting plate 220, UV light is shielded by the convex portions 231a and 231b of the optical base 230 depending on its direction of irradiation, and casts a shadow over the adhesive. The cumulative quantity of light of the UV light in the shadowed portion of the adhesive becomes significantly smaller compared to the portion directly irradiated with UV light. As a result, curing shrink variation occurs in the adhesive.

At this time, as variation occurs in the degree of curing shrink on the upper and lower sides of each of the convex portion 231a and the convex portion 231b, bias occurs in the stress applied to the mounting plate 220 until the adhesive is completely solidified. In the example shown in FIG. 23, in a case where UV light is radiated from an oblique upper portion of the optical detector 210, a portion of the application point 241 is hidden by the convex portion 231a, and a shadow B which is not irradiated with UV light is formed. Similarly, a portion of the application point 243 is hidden by the convex portion 231b, and a shadow B which is not irradiated with UV light is formed.

On the other hand, the application point 240 which makes a pair with the application point 241 is uniformly irradiated with UV light, and similarly, the application point 242 which makes a pair with the application point 243 is uniformly irradiated with UV light. In this way, in each of the right and left application points, a difference appears in curing reaction on the upper and lower sides.

As a result, it is believed that the positional deviation of the optical detector 210, an increase in focus offset accompanying the positional deviation, and deterioration of reproduction signal characteristics are caused.

On the other hand, it is significantly difficult to suppress the positional deviation of the optical detector 210 (or optical detector 10) occurring in storage durability, i.e., with temporal changes, without variation by changing the application positions or application amount of an adhesive, and the physical properties or characteristics of the adhesive. Accordingly, in order not to exceed this allowable value in total, it is necessary to minimize positional deviation in an initial completion state.

Under the above discussion, the present inventor realized the configuration of the optical pickup which reduces the positional deviation of the optical detector by suppressing variation in radiation of UV light. Hereinafter, a description will be made.

Figure 2:
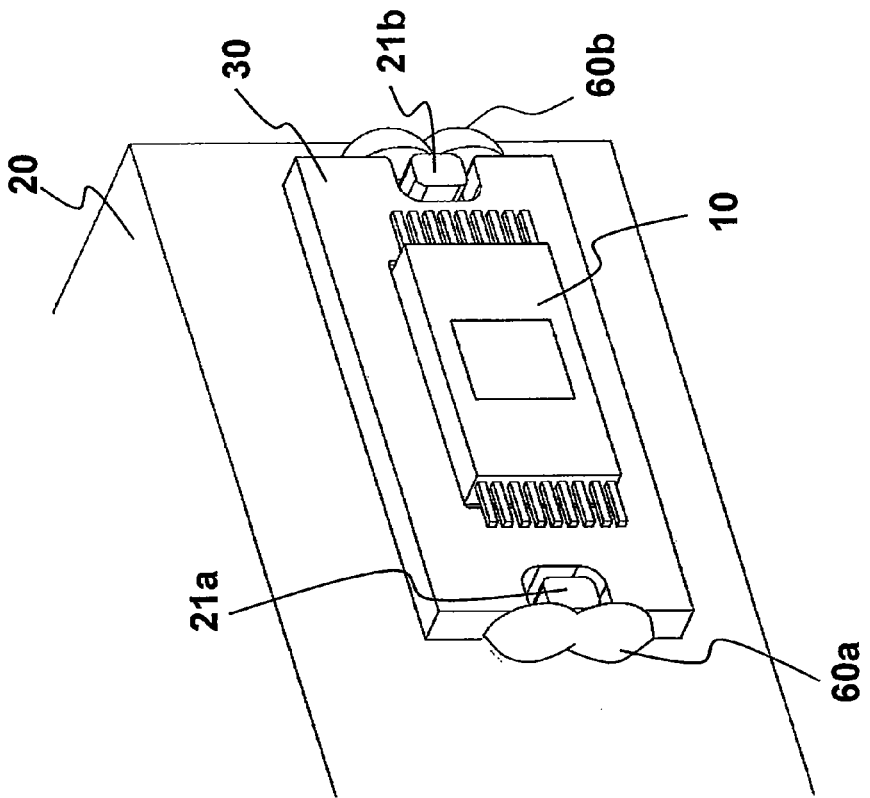
FIG. 2(a) is a view showing a peripheral configuration of an optical detector 10 of the optical pickup in Embodiment 1 of the present invention.
FIG. 2(b) is a view showing the peripheral configuration of the optical detector 10 of the optical pickup in Embodiment 1 of the present invention.
Figure 2:
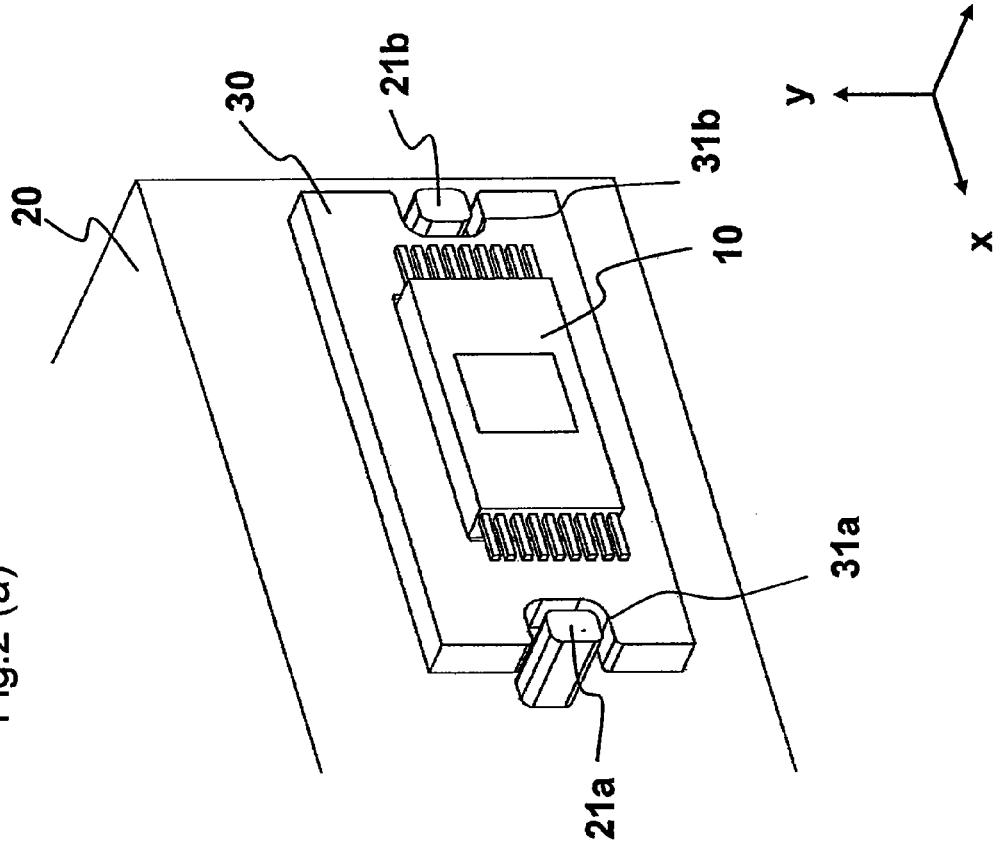

A perspective view of the structure around the optical detector 10 of the optical pickup of this embodiment 1 is shown in FIG. 2(a). A pair of convex portions 21a and 21b is provided on the optical base 20. The convex portions 21a and 21b are prismatic members which have a rectangular cross-sectional shape in their drawing direction, and are formed integrally with the optical base 20. In addition, the support holder 30 has a pair of notches 31a and 31b which is provided corresponding to the position and shape of the convex portions 21a and 21b, and is formed so as to pass through both principal planes, and the convex portions 21a and 21b are arranged within the notches 31a and 31b, respectively.

In addition, the optical detector 10 attached to the support holder 30 is adjusted in three directions of x, y, and z shown in the coordinate in the drawing with respect to the optical base 20 together with the support holder 30, and as shown in FIG. 2(b), both ends of the support holder 30 are fixed by adhesives 60a and 60b in the positions after adjustment. If the optical base 20 and the support holder 30 are made of a metal member, there is an advantage that the strength against impact can be increased. Additionally, although the adhesives 60a and 60b may be adhesives made of a photo-curable resin material, especially if the adhesives are made of UV-curable resin, not only thermal stability and impact resistance are high, but also the time required for fixation can be shortened. Therefore, there is also an advantage that the productivity improves.

Next, an example of the dimensions of respective parts of the optical detector 10 is shown in FIGS. 3A and 3B. Especially, a cross-sectional shape of the convex portion 21a is a rectangle in which a long side is 1.6 mm and a short side is 1.2 mm, and the surface of the notch 31a and the surface of the convex portion 21a are arranged so as to maintain a unique distance of 0.5 mm in an arbitrary location. In addition, although the corners of the cross-section has roundness in the drawing, the corners are not limited by the machining profile of the corners (whether the corners are straight or curved) so long as the corners have a shape which has two sets of parallel faces as a rectangle.

Next, xy plane views around the optical detector, which show the arrangement relationship of the support holder 30, the convex portions 21a and 21b, and the adhesives 60a and 60b that are UV-curable resins, are shown in FIGS. 4A to 4D.

Figure 4:
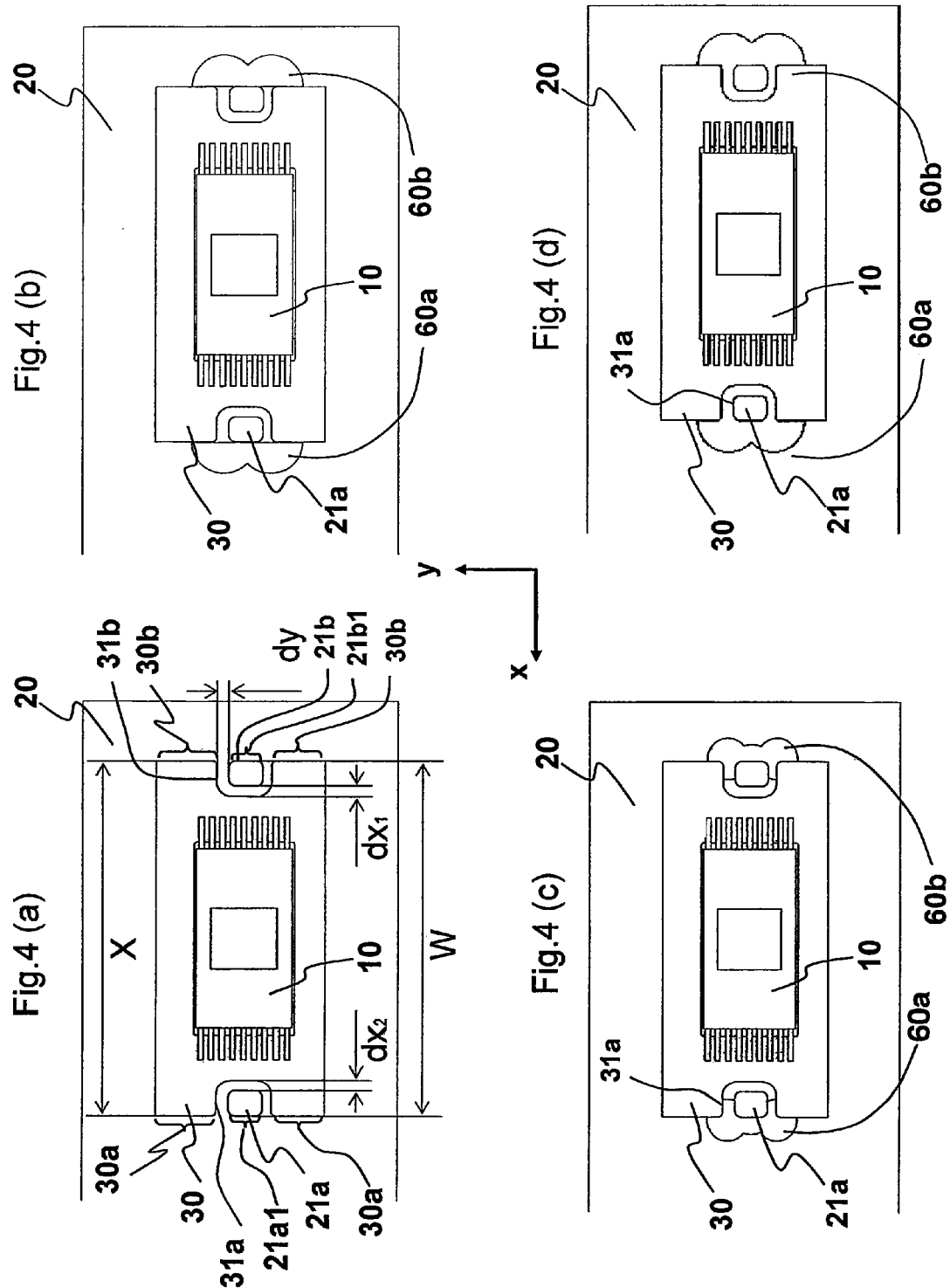
FIG. 4(a) is a view showing the positional relationship in the peripheral configuration of the optical detector 10 of the optical pickup in Embodiment 1 of the present invention.
FIG. 4(b) is a view showing application positions of adhesives 60a and 60b in the peripheral configuration of the optical detector 10 of the optical pickup in Embodiment 1 of the present invention.
FIG. 4(c) is a view showing application positions of the adhesives 60a and 60b in the peripheral configuration of the optical detector 10 of the optical pickup in Embodiment 1 of the present invention.
FIG. 4(d) is a view showing application positions of the adhesives 60a and 60b in the peripheral configuration of the optical detector 10 of the optical pickup in Embodiment 1 of the present invention.

FIG. 4(a) shows an example of the dimensional relationship immediately before adjustment between the support holder 30 and the convex portions 21a and 21b of the optical base 20 in the optical pickup of this embodiment 1. The distance between side faces 21a1 and 21b1, which do not face the surfaces of the notches 31a and 31b of the support holder 30, among the side faces of the two convex portions 21a and 21b is defined as W, and the width of the support holder 30 is defined as X. Also, among gaps between the convex portions 21a and 21b and the notches 31a and 31b of the support holder 30, the spacing of a gap between the convex portion 21b and the notch 31b on the right in the drawing as seen from the outside of the optical pickup of an x-direction component is defined as $dx_1$, and the spacing of a gap between the convex portion 21a and the notch 31a on the left in the drawing is defined as $dx_2$. In addition, the spacings $dx_1$ and $dx_2$ before adjustment need to be values equal to or more than the maximum amount of adjustment dx by which the optical detector 10 needs to be adjusted in the x direction.

Here, it is desirable that the relationship of the following Expression (A) is satisfied between the distance W and the width X.

(Expression 4)

$$W \leq X \tag{A}$$

That is, the distance W between the side faces 21*a*1 and 21*b*1 of the convex portions 21*a* and 21*b*, which do not face each other, satisfies the relationship which becomes equal to or less than the width X of the support holder 30 in the direction of right and left ends.

The following advantages are obtained by adopting such a configuration. After the optical detector 10 which is held from the outside by a jig and is floated on the air along with the whole support holder 30 is adjusted with high accuracy, as shown in FIGS. 4B to 4D, the adhesives 60*a* and 60*b* are applied so as to bridge between both ends of the support holder 30 and the convex portions 21*a* and 21*b* of the optical base 20, respectively.

Then, in a case where the UV light for curing the adhesives 60*a* and 60*b* is radiated simultaneously on the right and left, the degree of projection of the side faces of the convex portions 21*a* and 21*b* is small even if the radiation direction angle of the UV light has slightly deviated from an ideal horizontal position. Therefore, the UV light is not shielded by the convex portions 21*a* and 21*b* and is radiated on all the regions of the adhesives 60*a* and 60*b*.

Figure 5:
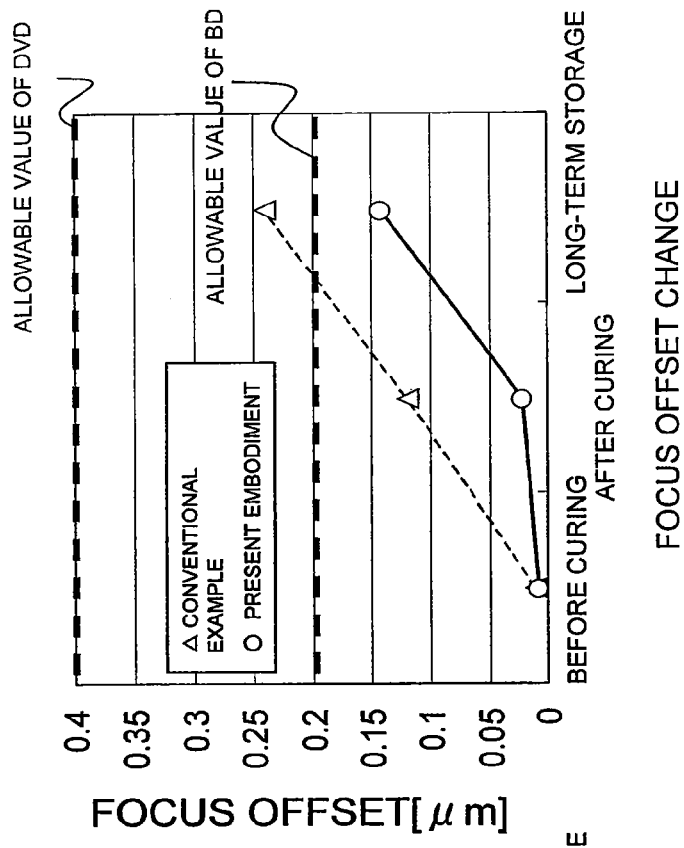
FIG. 5(a) is a view showing a graph when characteristics of optical pickups in Embodiment 1 of the present invention and a conventional example are evaluated by using changes in the value of focus offset accompanying temporal changes.
FIG. 5(b) is a view showing a graph when characteristics of the optical pickups in Embodiment 1 of the present invention and the conventional example are evaluated by using changes in FE asymmetry accompanying temporal changes.
Figure 5B:
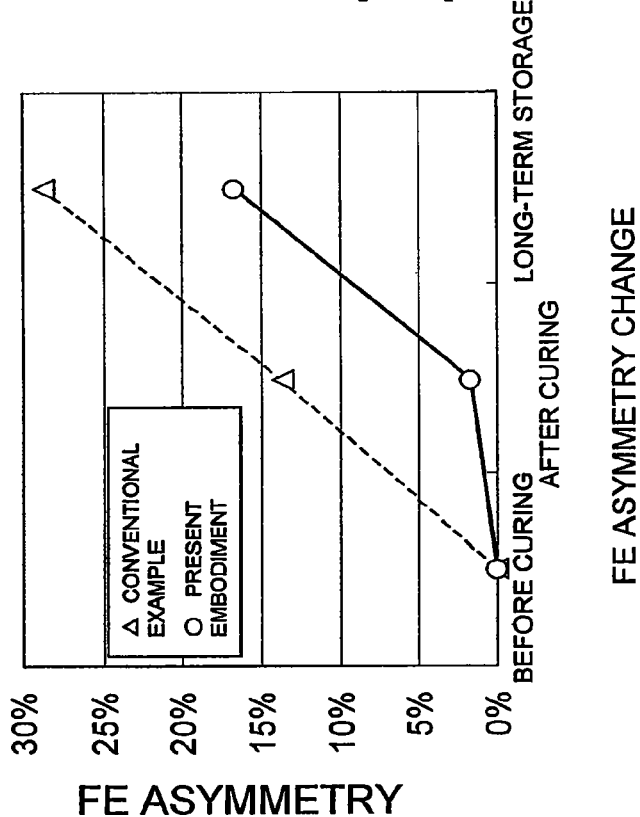

Here, a graph when characteristics of the optical pickup according to this embodiment 1 are evaluated by using changes in value of focus offset accompanying temporal changes is shown in FIG. 5(*a*), and a graph when the characteristics are evaluated by using the asymmetry of FE signals accompanying temporal changes is shown in FIG. 5(*b*), each shown with the case of the conventional example. In addition, the asymmetry of an FE signal is an index expressed by (Aa−Ab)/2(Aa+Ab) when the upper amplitude of the FE signal is defined as Aa and the lower amplitude thereof is defined as Ab, with respect to a GND level.

As shown in FIG. 5(*a*), in both the conventional example and this embodiment, ideal offset states are maintained immediately before completion, i.e., after the completion of adjustment and before the curing of adhesives. However, immediately after curing, a focus offset of about 0.12 μm occurs in the conventional example, whereas the focus offset in this embodiment is suppressed to be about 0.02 μm.

Figure 22:
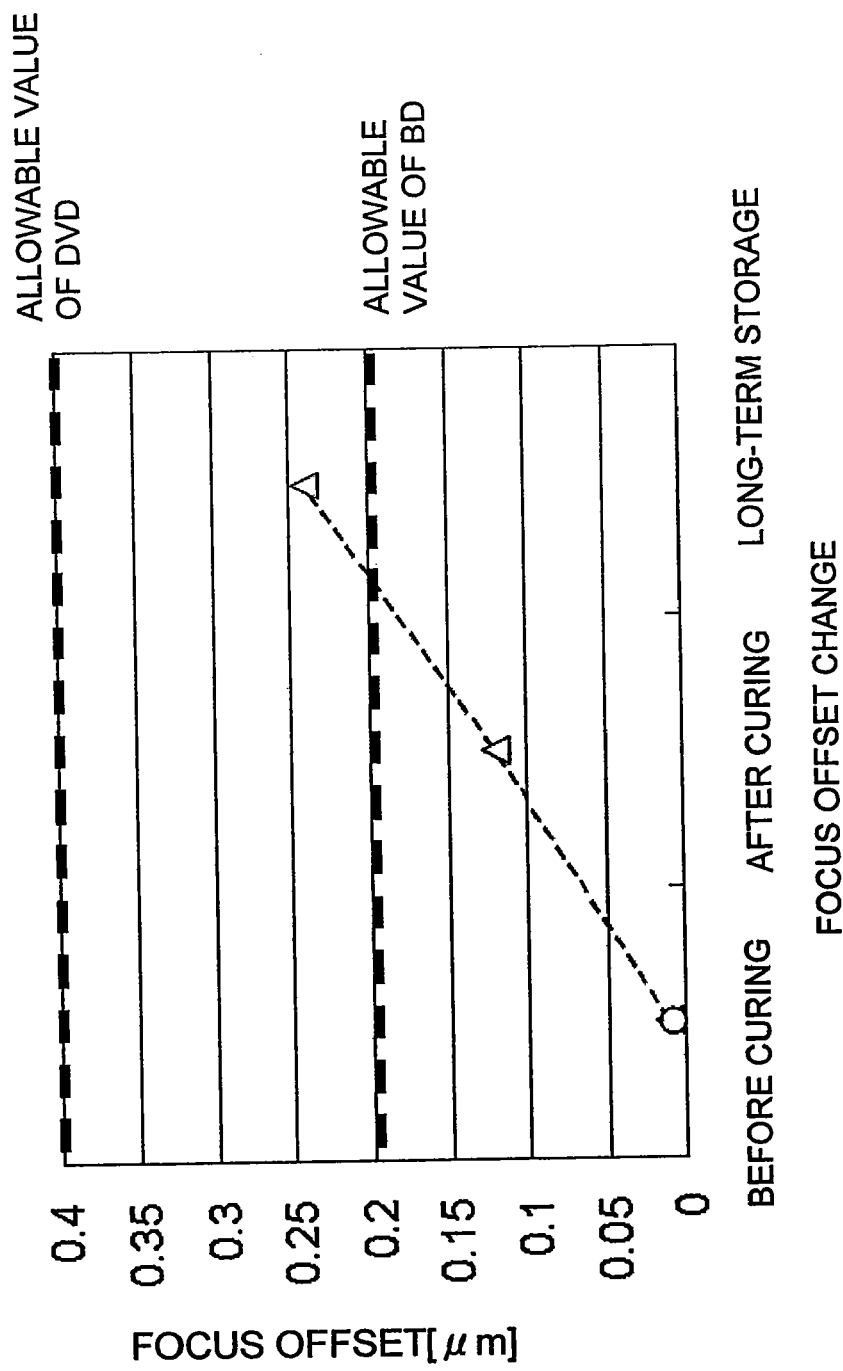
FIG. 22 is a view showing a graph when characteristics of the conventional optical pickup are evaluated by using changes in value of the focus offset accompanying temporal changes.

Moreover, when the optical pickups have been stored over the long term and have been subjected to progress experiments under the same temperature conditions and humidity conditions as the case of FIG. 22, in this embodiment, the increase in focus offset is suppressed to about 0.14 μm which falls below the allowable value of 0.2 μm of the BD.

Next, as shown in FIG. 5(*b*), in the conventional example, the asymmetry of FE signals deteriorates to about 13.5% after curing. In contrast, in this embodiment, the asymmetry of FE signals is suppressed to about 0.2% after curing, and is suppressed to 16.0% after long-term storage. On the other hand, in the conventional example, the asymmetry of FE signals after long-term storage increases to higher than 25%.

As such, according to the optical pickup of this embodiment, the convex portions 21*a* and 21*b* and the support holder 30 are configured so that the radiation unevenness of UV light does not occur when the adhesives are cured. Thereby, even if the adhesives 60*a* and 60*b* have been cured and shrinked, there is an advantage that the occurrence of deviation when the optical detector 10 is fixed is reduced to equal to or less than below an allowable range, and excellent signal characteristics can be obtained. In addition, in this case, it is more preferable if the application positions of the adhesives are symmetrical in the horizontal direction with respect to the optical detector 10.

Here, especially excellent points of a solution to the positional deviation of the optical detector 10 according to the embodiment as described above will be further described by comparison with the conventional example.

In the conventional example shown in FIG. 21, since the convex portions 231*a* and 231*b* have shapes such that the convex portions stick out outward from both right and left ends of the mounting plate 220, a portion of the UV light radiated onto the adhesive is shielded. This causes variation in curing shrink of the adhesives as described above.

Especially, since the convex portions 231*a* and 231*b* stick out at both ends, respectively, of the mounting plate 220, as shown in FIG. 23, the adhesives are split into upper and lower application points 240 and 241 and upper and lower application points 242 and 243, which become four points in total, at both right and left ends.

Accordingly, in the configuration of the conventional example, in order to suppress the positional deviation of the optical detector 210, all the plurality of application points 240 to 243 should be uniformly and simultaneously irradiated with UV light. If not, the positional deviation of the optical detector 210 will certainly occur.

Only in the case where the irradiation is performed simultaneously on the right and left from directions completely horizontal to the directions of both ends of the mounting plate 220, simultaneous irradiation onto the application points 240 to 243 can be attained. In this case, only a minimum of two points are required as objects to be simultaneously irradiated. However, in this case, meticulous attention is needed for the alignment for always maintaining the horizontal direction. That is, as described in the discussion referred to FIG. 23, if the irradiation angle slightly deviates from the horizontal direction, unevenness occurs in the irradiation regions, and a difference appears in the curing reaction on the upper and lower sides in each of the right and left application points. Thereby, the positional deviation of the optical detector during curing will certainly occur.

Accordingly, for example, when optical pickups are mass-produced, a new problem that productivity is significantly reduced may occur with this countermeasure because of the time and effort required for the alignment between the optical fiber and the mounting plate.

On the other hand, in order to simultaneously irradiate four points without taking the adjustment of alignment into consideration, it will be necessary to make UV light radiated using four UV light radiation apparatuses, or from an optical fiber branched into four pieces from one or a plurality of UV-light radiation apparatuses. As a result, a new problem that the apparatus is enlarged may occur in any case.

As such, as long as the configuration of the conventional example is used, the solution to the positional deviation of an optical detector has problems that the difficulty of implementation or a new problem accompanying the implementation occurs. In contrast, this embodiment has marked advantages that the positional deviation of an optical detector can be reliably suppressed without causing a new problem, by a simpler configuration including changes in the shape of the convex portions 21*a* and 21*b* and changes in the positional relationship between the convex portions 21*a* and 21*b* and the support holder 30.

Moreover, the conditions of respective parts for optimizing the configuration of the optical pickup of this embodiment will be concretely described.

As described with reference to FIG. 4(a), the spacing $dx_1$ and spacing $dx_2$ before adjustment are determined to be values equal to or more than the maximum amount of adjustment dx such that the optical detector 10 can be adjusted in the x direction. However, in order to maintain the mechanical strength of the support holder 30, it is desirable that the value of the amount of adjustment dx is as small as possible.

Moreover, it is desirable that the relationship of the following Expression (B) is satisfied among the amount of adjustment dx, the distance W, and the width X.

(Expression 1)

$$X-W \geq 2dx \quad \quad (B)$$

By adopting such a configuration, even if the support holder 30 is moved to the right (left) to the maximum amount of adjustment dx when the optical detector 10 is adjusted, the side face 21a1 of the convex portion 21a, which does not face the support holder 30, does not protrude further outward than a left end face 30a (right end face 30b) of the support holder 30. This relationship is expressed by Expression $(X/2)-dx \geq (W/2)$, a modification of which coincides with Expression (B).

Accordingly, there is more reliably obtained the advantage that deviation during the fixation of the optical detector 10 is eliminated by no occurrence of radiation unevenness during the aforementioned UV radiation after the application of the adhesives 60a and 60b.

Additionally, in this case, the value of a smaller one of the spacing $dx_1$ and spacing $dx_2$ before adjustment is made to coincide with the amount of adjustment dx. By making the spacing before adjustment small to an adjustment value dx, the support holder 30 contacts the convex portion 21a (or 21b) at the maximum value of the amount of adjustment dx in the x direction, and the convex portion 21b (or 21a) functions as a stopper for keeping the support holder 30 from moving beyond the amount of adjustment dx. By adopting such a configuration, there is an advantage that higher accuracy and higher-speed adjustment can be attained, and productivity improves.

Figure 6:
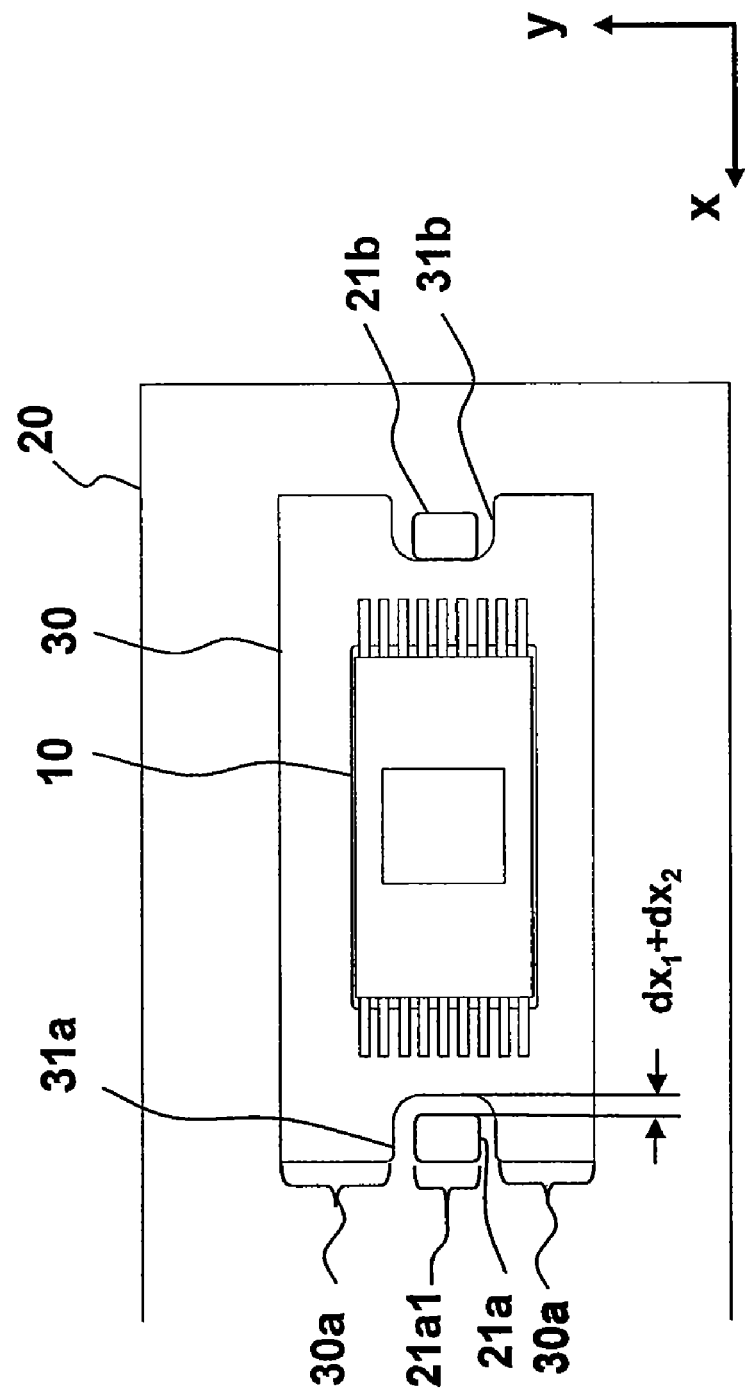
FIG. 6 is a view showing an example of positional adjustment of a support holder 30 of the optical pickup in Embodiment 1 of the present invention.

Here, FIG. 6 shows the state of the optical pickup after the adjustment of moving the support holder 30 in the −x direction with the maximum amount of adjustment $dx=dx_1$ with respect to the spacing $dx_1$ is performed in a case where the support holder 30 and the convex portions 21a and 21b are prepared on the condition of X>W according to Expression (A), the spacing of the gap between the convex portion 21b and the notch 31b before adjustment is defined as $dx_1$, and the spacing of the gap between the convex portion 21a and the notch 31a is defined as $dx_2$ ($dx_2 > dx_1$).

As shown in FIG. 6, the notch 31b of the support holder 30 contacts the convex portion 21b and does not move in the −x direction any more. In addition, since the end face 30a of the support holder 30 where the notch 31a is provided and the side face 21a1 of the convex portion 21a are arranged on the same plane, a configuration in which the convex portion 21a protrudes like the conventional example is hindered.

Figure 7:
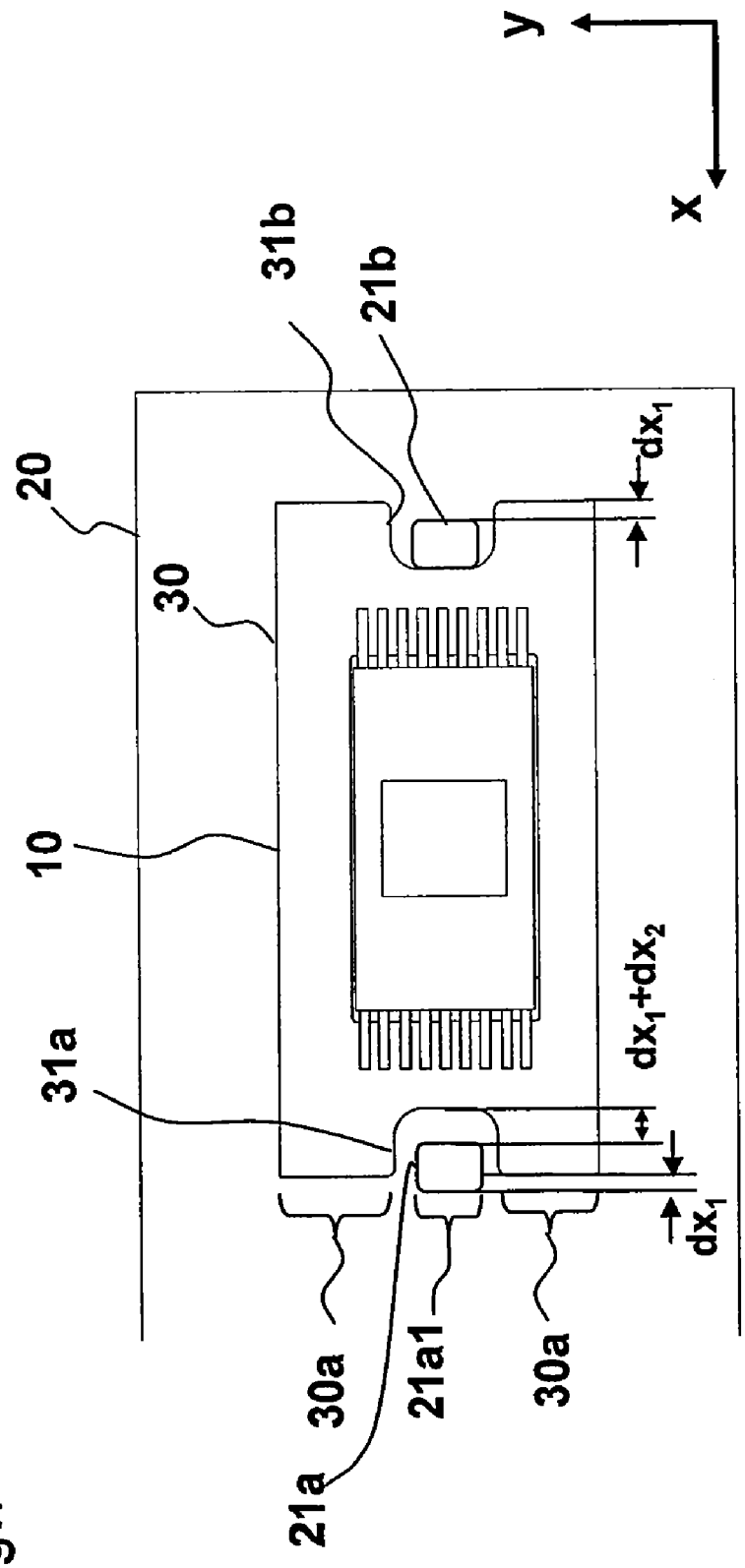
FIG. 7 is a view showing an example of positional adjustment of the support holder 30 of the optical pickup in Embodiment 1 of the present invention.

Next, FIG. 7 shows the state of the optical pickup after the adjustment of moving the support holder 30 in the −x direction with the maximum amount of adjustment $dx=dx_1$ with respect to the spacing $dx_1$ is performed in a case where, similarly to FIG. 4(a), the support holder 30 and the convex portions 21a and 21b are prepared on the condition of X=W according to Expression (A), the spacing of the gap between the convex portion 21b and the notch 31b before adjustment is defined as $dx_1$, and the spacing of the gap between the convex portion 21a and the notch 31a is defined as $dx_2$ ($dx_2 > dx_1$). In this case, the side face 21a1 of the convex portion 21a, which does not face the surface of the notch 31a, protrudes outward by $dx_1$ with respect to the end face 30a of the support holder 30. On the other hand, on the right end face of the support holder 30, the convex portion 21b is arranged inside the notch 31b so as to retreat by the spacing $dx_1$ of a gap corresponding to the amount of adjustment dx.

However, even when any deviation has occurred between the side face of the convex portion 21a (or 21b) and either right or left end face of the support holder 30, when the size of the deviation is in the amount of adjustment dx, the deviation can be treated as an error, and the advantages of the present invention are not impaired. Because that the maximum value that the amount of adjustment dx takes is set to about 200 to 300 μm as compared to the dimensions of the respective parts shown in FIG. 3, however, in this configuration, the positional deviation of the optical detector 10 to be generated when the adhesives 60a and 60b are cured according to the value of dx is about 1 μm, and the focus offset change at that time is merely about 0.01 μm. Even if the storage durability is taken into consideration in addition to this, it is possible to sufficiently suppress the threshold value to 0.2 μm or less such that an excellent reproduction signal can be obtained. In the case of FIG. 7, since the protruding degree of the side face 21a1 of the convex portion 21a from the side face 30a of the support holder 30 is $dx_1=dx$, this requirement is satisfied. In addition, since the degree to which the convex portion 21b exists further inward than the right side face of the support holder 30 is also $dx_1=dx$, this requirement is satisfied.

In addition, even in the configuration example shown in FIG. 6, the convex portion 21b is arranged further inward than the spacing before adjustment on the right end face of the support holder 30. However, since the relationship of $dx_1=dx$ is maintained, the above requirement is satisfied. In addition, in the above description, as for the arrangement of the side face 21a1 of the convex portion 21a, the side near the optical detector 10 was defined as the inside, and the side far from the optical detector 10 was defined as the outside.

Additionally, in the above description, the spacing of the gap between the convex portion 21b and the notch 31b before adjustment was defined as $dx_1$, and the spacing of the gap between the convex portion 21a, and the notch 31a is defined as $dx_2$ ($dx_2 > dx_1$). However, generally, which one of the two spacings is larger is arbitrary. Accordingly, with respect to one spacing, when the spacing before adjustment at one end face of the support holder 30 is defined as $dx_a$, and the spacing before adjustment at the other end face of the support holder 30 is defined as $dx_b$, (Expression 2)

$$dx_a \leq dx_b \quad \quad (C)$$

and (Expression 3)

$$X-W \geq 2dx_a \quad \quad (D)$$

need to be established. In addition, the example shown in FIG. 4(b) is a configuration in which adjustment is completed by Width X=Distance W, Amount of Adjustment dx=0, and Spacing $dx_1=dx_2$, and satisfies all the conditions of the above (A) to (D).

Next, the application points of the adhesives 60a and 60b will be described with reference to FIGS. 4B to 4D.

In the case of a configuration in which the application positions of the adhesives 60a and 60b are such that the adhesives are kept from flowing into the gaps between the convex portions 21a and 21b and the notches 31a and 31b of the support holder 30 as in FIG. 4(b), there is an advantage that the balance deviation of curing shrink caused by radiation of UV light mostly hardly occurs, and the positional deviation of the optical detector 10 during fixation hardly occurs.

In addition, in the case of a configuration in which a small amount of adhesives flow into the gaps as in FIG. 4(c), while the balance deviation of curing shrink is suppressed to the minimum, there is an advantage that the area of adhesion between the convex portions 21a and 21b and the support holder 30 increases, thereby enhancing the holding strength of the support holder 30.

Additionally, in the case of a configuration in which the adhesives 60a and 60b flows into the gaps so as to fill the gaps as in FIG. 4(d), the holding strength of the support holder 30 is high, and it is also possible to adopt a configuration in which the spacings $dx_1$ and $dx_2$ of the gaps are made small so that the curing shrink balance deviation is suppressed to the minimum. In addition, in the case of a configuration of FIGS. 4C and 4D in which the adhesives 60a and 60b flow into the gaps, when adhesives having anaerobic properties which starts an advantage reaction as the adhesives are not touched by air are used as the adhesives 60a and 60b, there is an advantage that the portion that UV light does not reach can also be reliably cured, and the holding strength of the support holder 30 can be further enhanced.

In addition, in the configuration example shown in FIG. 6, either the convex portion 21a or the convex portion 21b may protrude from both ends of the support holder 30. However, as shown in FIG. 7 or respective drawings of FIGS. 4A to 4D, it is more desirable that the convex portions 21a and 21b exist at the same positions as both ends of the support holder 30 or further inward than both ends. This is because, especially as shown in FIG. 4(b), the adhesives 60a and 60b more easily bridge, i.e., more easily become integral on the upper and lower sides of the convex portions 21a and 21b if the convex portions exist further inward than both ends. Ina case where the convex portions protrude from the support holder 30, even if the influence of shielding of UV light fall within a range of error as mentioned above, there is a possibility that curing unevenness may occur unless the adhesives bridge.

Additionally, in the case of a configuration in which the adhesives 60a and 60b are respectively applied to the positions of both right and left end faces of the support holder 30 as in this embodiment 1, the portions applied at the positions of both the right and left ends greatly contribute to the holding of the support holder 30, and contribution of the portions which have flowed into the gaps between the notches 31a and 31b of the support holder 30 and the convex portions 21a and 21b is not great.

Figure 8:
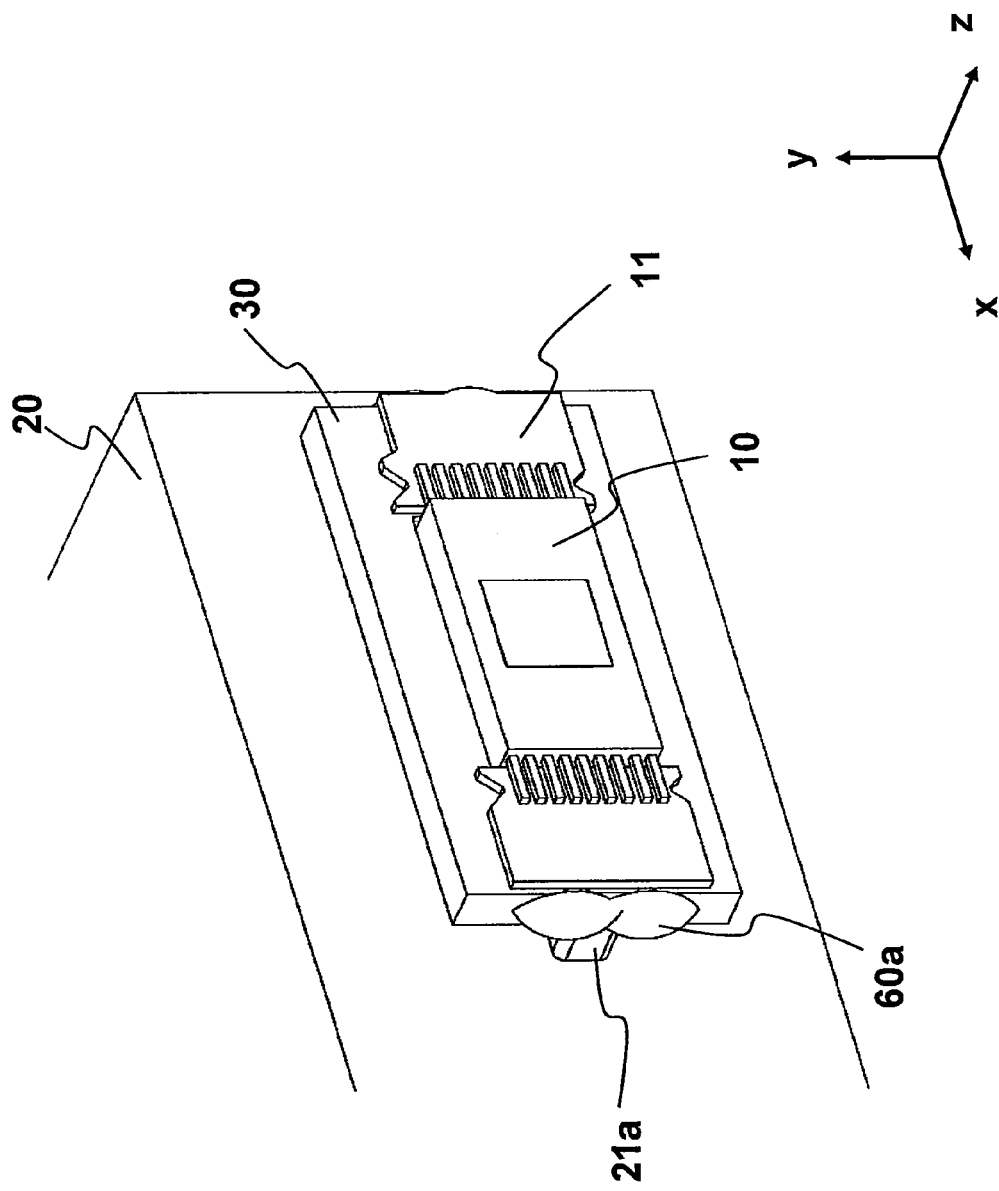
FIG. 8 is a view showing another example of the peripheral configuration of the optical detector 10 of the optical pickup in Embodiment 1 of the present invention.

Accordingly, for example, like a configuration shown in FIG. 8, even if a circuit board 11 which transmits an output signal of the optical detector 10 is arranged at a position on the support holder 30 such that the convex portions 21a and 21b are covered, it is possible to firmly fix the support holder 30.

Figure 9A:
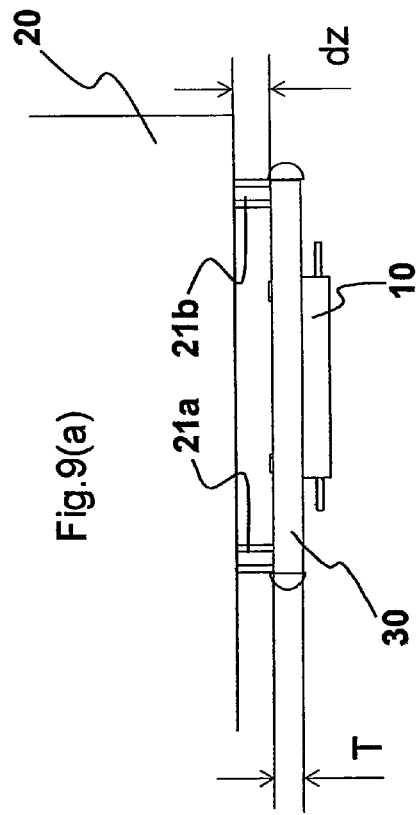
FIG. 9(a) is a view showing a still further example of the peripheral configuration of the optical detector 10 of the optical pickup in Embodiment 1 of the present invention.
Figure 9B:
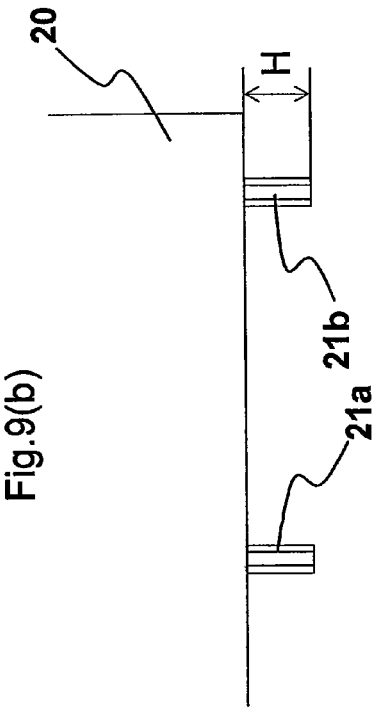
FIG. 9(b) is a view showing the still further example of the peripheral configuration of the optical detector 10 of the optical pickup in Embodiment 1 of the present invention.
Figure 9C:
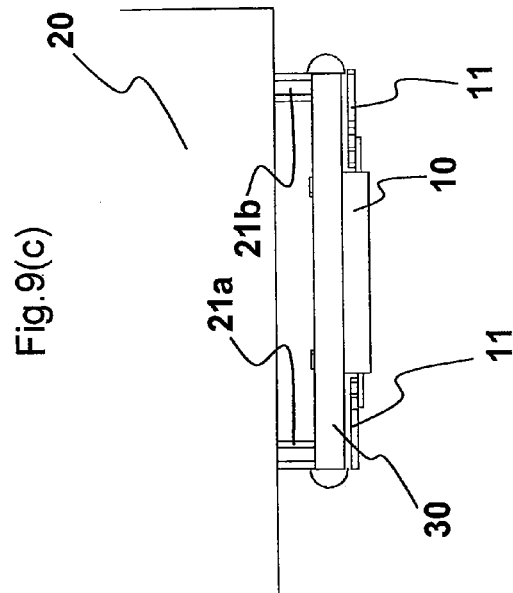
FIG. 9(c) is a view showing the still further example of the peripheral configuration of the optical detector 10 of the optical pickup in Embodiment 1 of the present invention.

Here, xz plane views around the optical detector are shown in FIGS. 9A to 9C. In FIG. 9, dz represents the gap spacing between the support holder 30 and the optical base 20 when the light-receiving region of the optical detector 10 is in an arrangement as designed, T represents the thickness of the support holder 30 in the z direction, and H represents the height of the convex portion 21 in the z direction. Here, it is desirable that the relationship of the following Expression (E) is satisfied among the spacing dz, the thickness T, and the height H.

(Expression 5)

$$H \leq dz + T \quad \text{(E)}$$

By adopting such a configuration, the convex portions 21a and 21b are kept from protruding further than the surface of the support holder 30 in the z direction. For this reason, parts can be freely arranged within the surface of the support holder 30 on the side of the optical detector 10. As a result, for example, as shown in FIG. 9(c), there is an advantage that a circuit board having a sufficient thickness can be used as the circuit board 11.

Additionally, although the adhesive 60 is mainly UV-curable resin, especially resins having higher viscosity during non-curing are more preferable. Especially, the viscosity is preferably 20000 mPa·s or more. By using such an adhesive, even if the adhesives 60a and 60b are applied to the support holder 30 and the convex portions 21a and 21b after positional adjustment of the optical detector 10, not only a situation where the adhesives running down due to gravity can be avoided, but also the adhesives 60a and 60b can be prevented from flowing into the gaps between the notches 31a and 31b of the support holder 30 and the convex portions 21a and 21b, and the portions which are not cured by the radiation of UV light can be minimized. Accordingly, there is an advantage that the reliability against any positional deviation after fixation improves.

Additionally, in the configuration of this embodiment 1, the support holder 30 is held with respect to the optical base 20 only via the adhesives 60a and 60b in a floated state on the air. Therefore, if the strength after curing of the adhesives 60a and 60b is low, there is a problem that the optical detector 10 may cause positional deviation in the whole support holder 30 due to a physical external force. In order to deal with this problem, it is desirable that the adhesives 60a and 60b has a hardness (Shore D) after curing of equal to or greater than 60 and equal to or less than 90. If the hardness is 60 or less, for example, even if an external force, such as the tension of a flexible printed board which transmits an output signal of the optical detector 10, is weak, the optical detector 10 may cause positional deviation gradually in the whole support holder 30 as the external force continues to be applied. Additionally, if the hardness is as high as 90 or more, when an instantaneous impact of about 300G to 500G is applied to the whole optical pickup, the adhesives are not able to bear the load generated due to the weight of the support holder 30 and the optical detector 10 itself, and the adhesives after curing cause a defect, such as cracking. If the hardness is equal to or greater than 60 and equal to or less than 90, problems do not occur, and the optical detector 10 and the support holder 30 can be stably held.

As described above, according to the optical pickup of this embodiment 1, positional deviation of the optical detector 10 caused by the curing shrink of the adhesives 60a and 60b during curing by UV-light radiation can be made small by using the small support holder 30.

Accordingly, an advantage that an adjusting/fixing device for the optical detector can be miniaturized at low cost is obtained. Additionally in a case where optical pickups are mass-produced, an advantage that the maintenance of the adjusting/fixing device for the optical detector is also easy, and productivity improves is also obtained.

Embodiment 2

A perspective view of the structure around the optical detector 10 of the optical pickup in this embodiment 2 is shown in FIG. 10(a). Configurations other than those shown in this drawing are the same as those in Embodiment 1, and their functions and advantages are also the same as those shown in Embodiment 1.

As shown in FIG. 10(a), the optical pickup of this embodiment 2 is characterized in that a cut-in portion 32a of the support holder 30 becomes a depression which does not pass through the whole thickness in the z direction, i.e., both the principal planes, and is formed over one surface and side face of the support holder 30. Although not directly shown in this drawing, another cut-in portion 32b also has the same configuration. Accordingly, as shown in FIG. 10(c), as seen from the xy plane, the convex portions 21a and 21b are in the state of being hidden by the surface of the support holder 30 and are not exposed to the outside. In addition, in the drawing, the profiles of the cut-in portions 32a and 32b are shown by broken lines.

By including the above feature, this embodiment 2 has the following advantages. In a case where the notches have passed through the whole thickness of the support holder 30 in the z direction as in the notches 31a and 31b of the support holder 30 in Embodiment 1, the mechanical strength of the support holder 30 cannot be made high. Therefore, for example, in a case where the impact of high G (acceleration) is applied, there is a probability that deformation of the support holder 30 itself occurs.

On the other hand, according to the configuration of this embodiment 2, there are advantages that the mechanical strength is enhanced without enlarging the support holder 30, all the configurations described in Embodiment 1 can be adopted, and the support holder 30 can be stably fixed to the optical base 20 via the adhesives 60a and 60b in a floated state on the air.

In addition, in the above Embodiments 1 and 2, the optical detector 10 is equivalent to the optical component of the present invention, the support holder 30 is equivalent to the support holder of the present invention, the optical base 20 is equivalent to the optical base of the present invention, and the notches 31a and 31b, and the cut-in portions 32a and 32b are equivalent to the concave portions of the present invention.

In addition, in the above Embodiments 1 and 2, especially, the method of fixing the support holder 30 which supports the optical detector 10 has been described. However, all the same advantages are obtained if the structure of the present invention is used even for fixation of a lens, a prism, a passive element like a diffraction grating, an active element like a laser diode or a photodiode, and other arbitrary optical components, as parts which require fixation by adhesives in a floated state on the air in various parts of the optical pickup which requires high-accuracy adjustment and fixation.

Especially, in a case where parts made of materials having low optical transparency are used or in a case where optical component are attached to a holder made of metal or resin having low optical transparency and the holder is adhered and fixed in a floated state on the air, the structure of the present invention can exhibit marked advantages.

Additionally, as for the optical configuration of the optical pickup, the system shown in FIG. 1 is an example. Even if any kind of optical system is used, all the same advantages are also obtained if the structure of the present invention is used as a structure which fixes an optical component held by a jig (not shown) in a floated state on the air for adjustment, etc.

Figure 11:
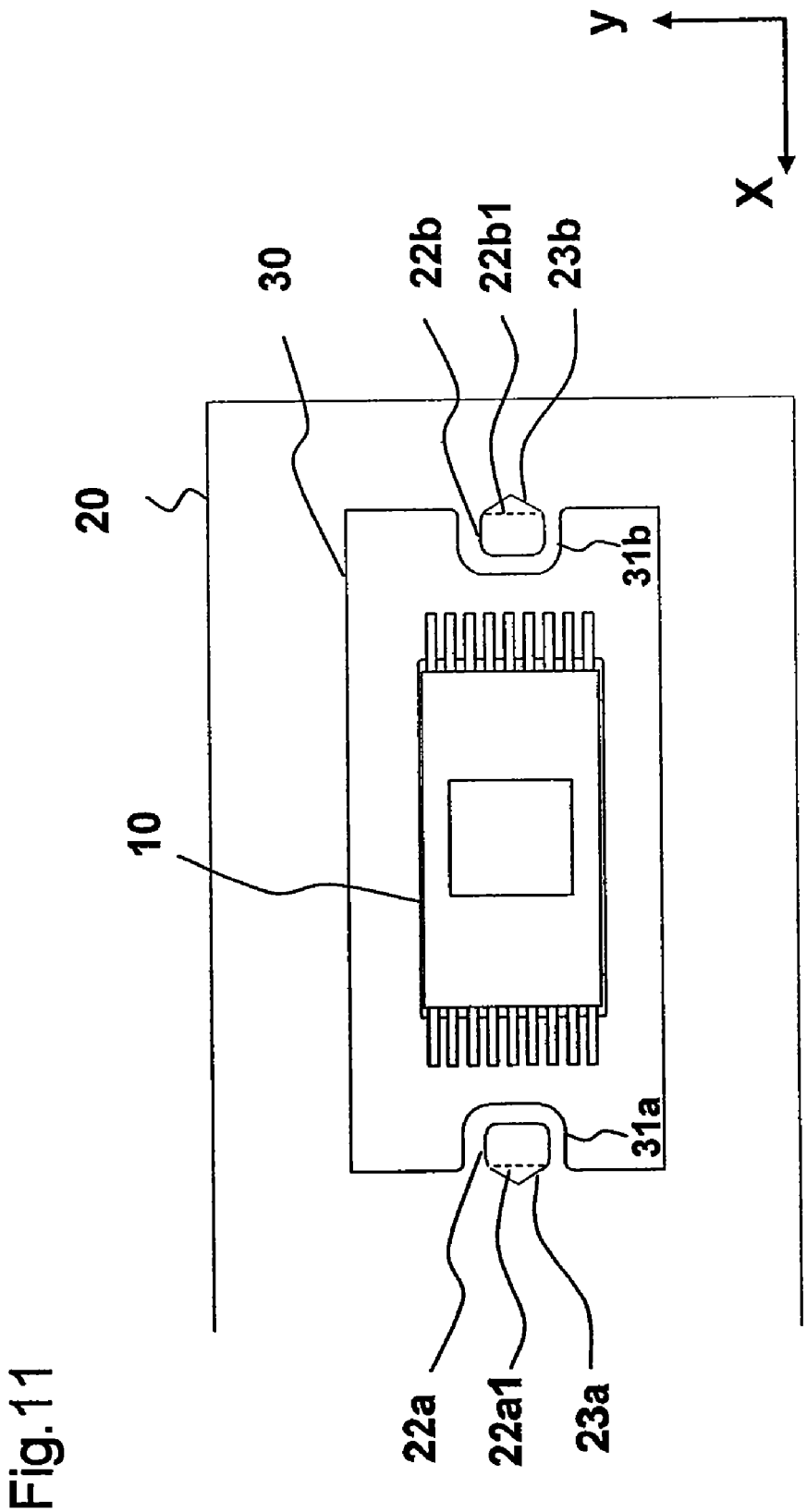
FIG. 11 is a view showing a still further example of the peripheral configuration of the optical detector 10 of the optical pickup of each embodiment of the present invention.

In addition, although the convex portions 21a and 21b of the optical base 20 have a rectangular cross-sectional shape in the drawing direction in the above embodiments 1 and 2, the convex portions may have other shapes. As an example, as shown in FIG. 11, a configuration using the convex portions 22a and 22b having a pentagonal cross-sectional shape is shown.

The cross-sectional shape of the convex portion 22a has protruding portion 23a formed by a pair of opposed oblique faces on the side face which does not face the notch 31a described in Embodiments 1 and 2. Since the protruding portions 23a and 23b incline with respect to the x-axis and the y-axis, even in a case where the radiation angle of UV light has deviated from the ideal horizontal position obliquely upward or obliquely downward, the dead angle which shields the UV light has decreased as compared with the case of the rectangular cross-section. Thus, it is possible to make UV light uniformly irradiate the adhesives.

At this time, in each of the protruding portions 23a and 23b, it is desirable that the distance between imaginary lines 22a1 and 22b1 which join points where the roots of the oblique faces are connected is equivalent to the distance W in Embodiment 1. That is, the protruding portions 23a and 23b have a configuration which is further added to the side faces 21a1 and 21b1 of the convex portions 21a and 21b in Embodiment 1. In this case, the convex portions 22a and 22b can take a greater horizontal width than the amount of adjustment dx, and can increase physical strength.

Figure 12:
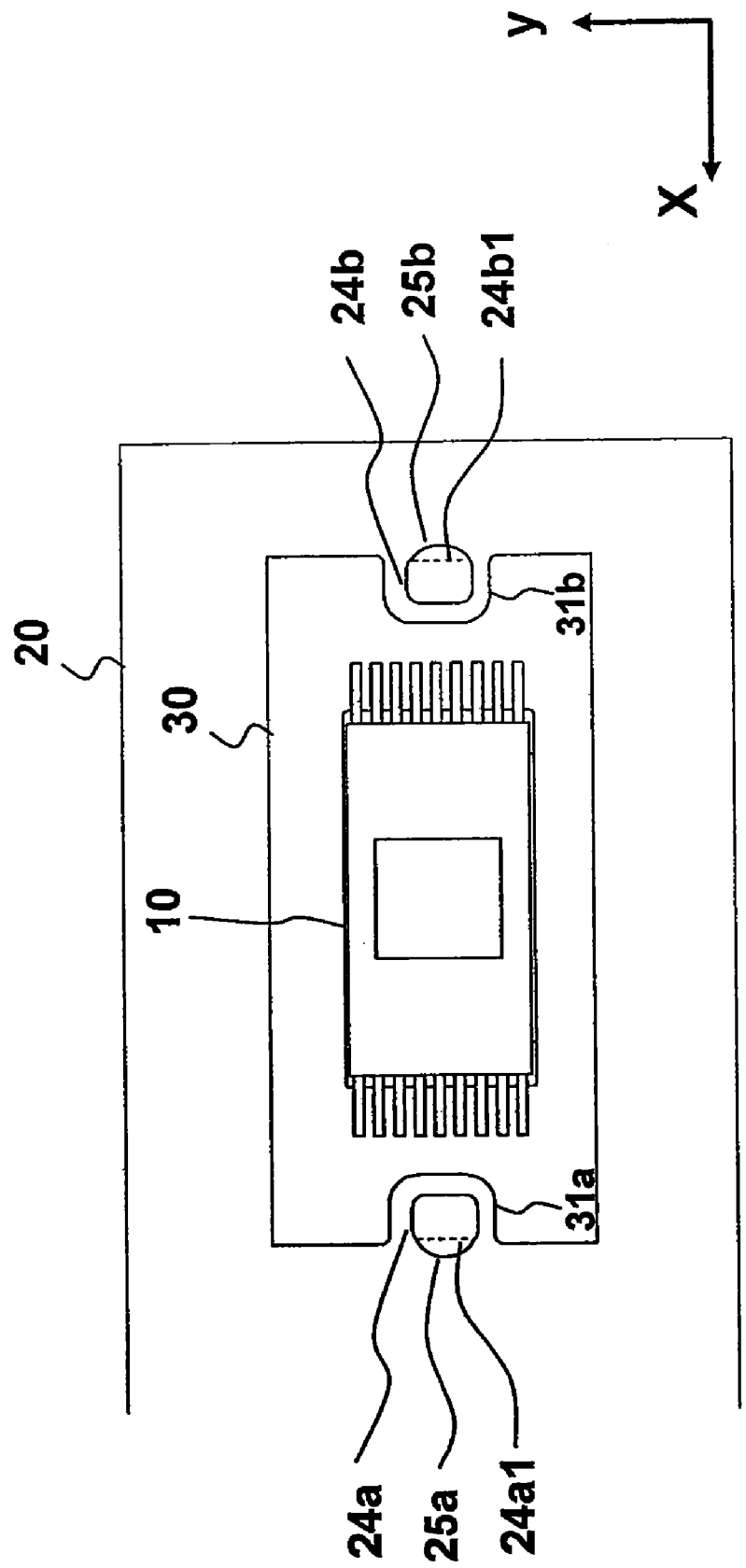
FIG. 12 is a view showing a still further example of the peripheral configuration of the optical detector 10 of the optical pickup in each embodiment of the present invention.

In addition, although the protruding portions 23a and 23b have been formed by a pair of opposed oblique faces, the same advantages are obtained even if they are constituted as convex portions 24a and 24b which have curved faces 25a and 25b which are positively bent, as shown in FIG. 12. In this case, the distance between the imaginary surface 24a1 and 24b1 which connects faces where the roots of the curved faces 25a and 25b are connected is equivalent to the distance W in Embodiment 1.

Figure 13:
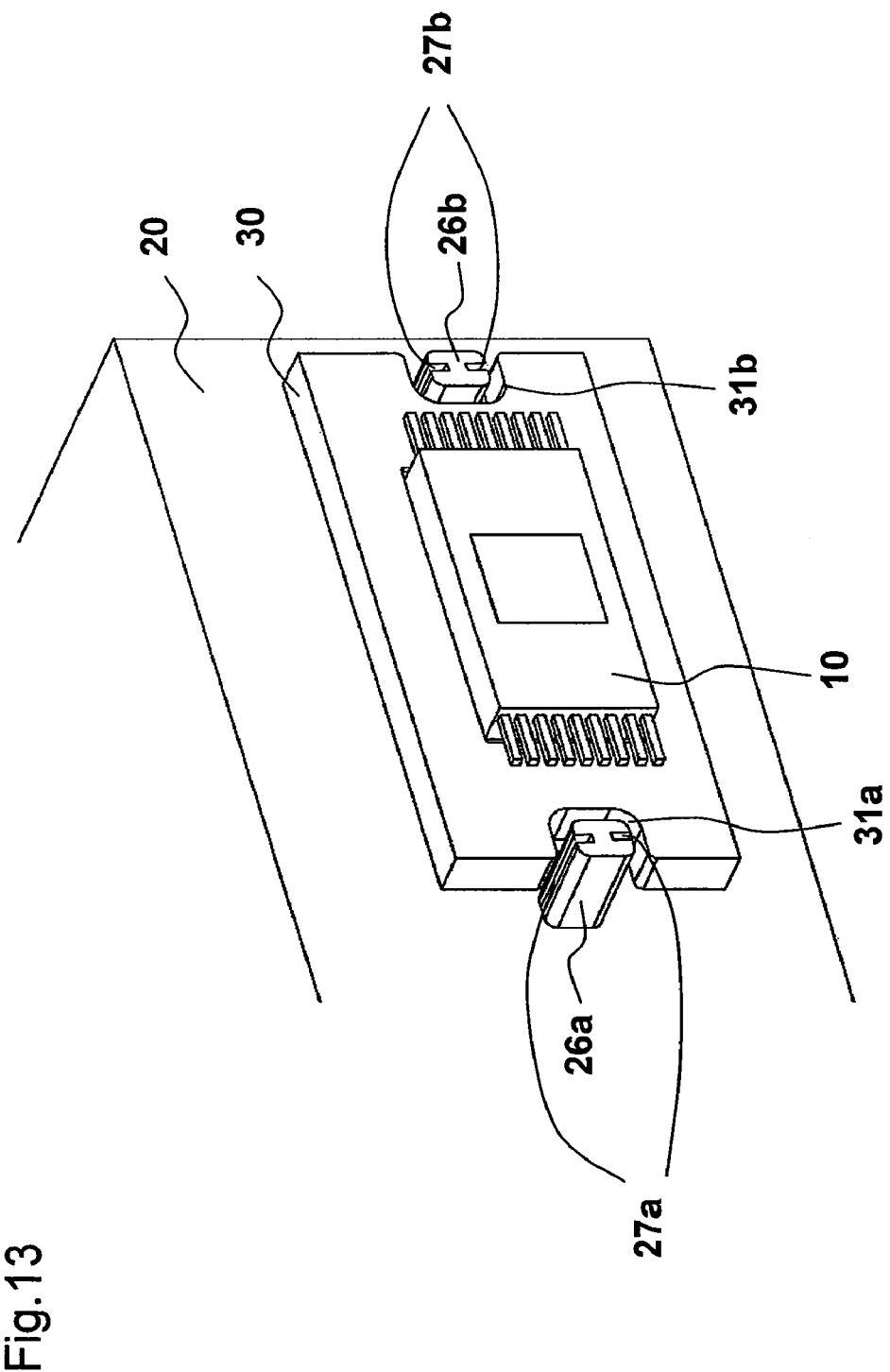
FIG. 13 is a view showing a still further example of the peripheral configuration of the optical detector 10 of the optical pickup in each embodiment of the present invention.

In addition, in the above description, the convex portions 21a and 21b have a rectangular cross-section, etc. However, as shown in FIG. 13, the convex portions may be realized as convex portions 26a and 26b having grooves 27a and 27b provided in their drawing direction formed on their surfaces, respectively. In this case, since applied adhesives 60a and 60b flow into the grooves 27a and 27b therealong, there is an advantage that the adhesives are prevented from flowing into the gaps between the convex portions 26a and 26b and the notches 31a and 31b of the support holder 30, and the configuration shown in FIG. 4(b) is more easily realized.

Figure 14:
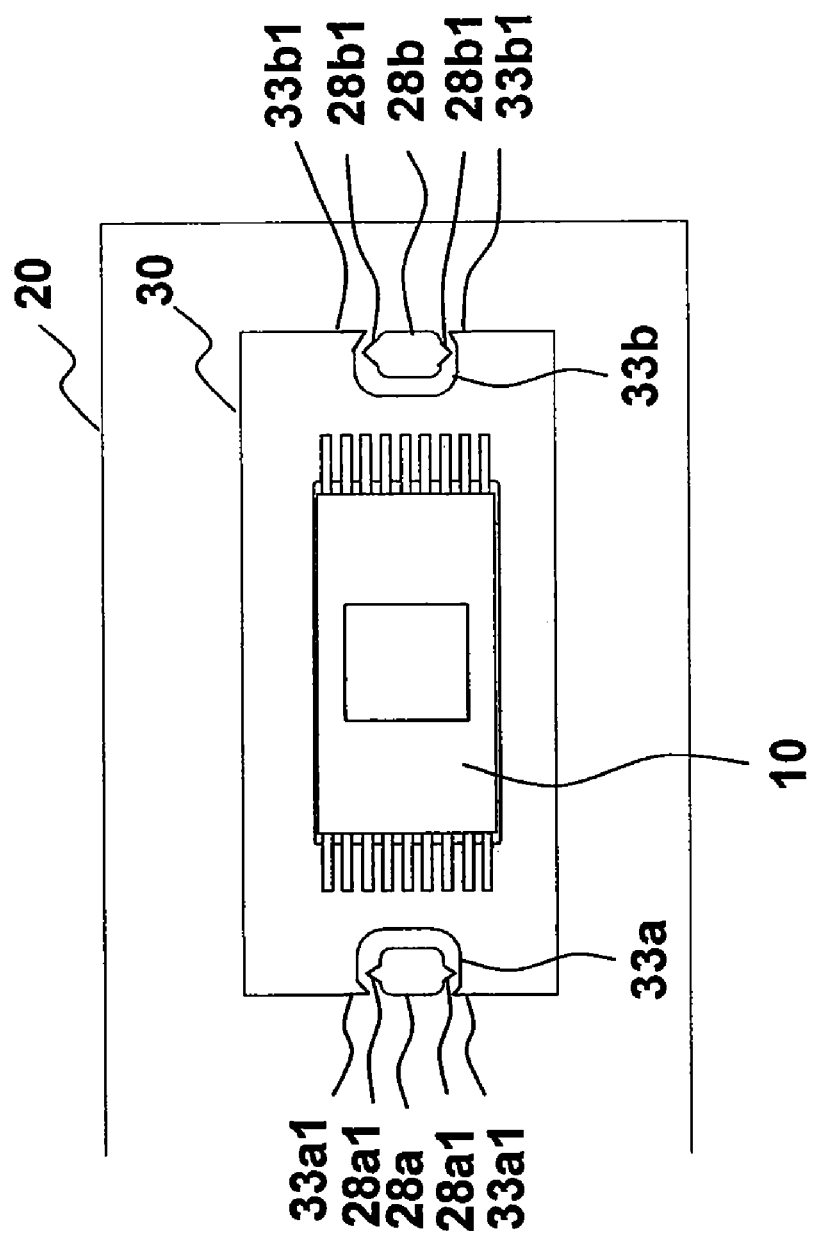
FIG. 14 is a view showing a still further example of the peripheral configuration of the optical detector 10 of the optical pickup in each embodiment of the present invention.

Similarly, a configuration example in which the adhesives are prevented from flowing into the gaps is shown in FIG. 14. As shown in FIG. 14, notches 33a and 33b of the support holder 30 have banks 33a1 and 33b1 on the upper and lower sides thereof, while convex portions 28a and 28b of the optical base 20 also have banks 28a1 and 28b1 on the upper and lower sides thereof, respectively. In the gaps, since the spacing of a portion where the banks 33a1 and 28a1 face each other and the spacing of a portion where the banks 33b1 and 28b1 face each other become smaller than other portions, the adhesives can be prevented from flowing into the deep sides of the gaps. In addition, the banks 33a1 and 33b1 on the side of the support holder 30 may be omitted.

In addition, although the convex portions 21a and 21b are metallic members formed integrally with the optical base 20 in the above description, the convex portions may be separate members using a resin material. In this case, if a transparent resin material is used as the resin material, it is possible to further reduce the influence of shielding of UV light by the convex portions. This advantage is able to further reinforce the surfaces of the notches 31a and 31b of the support holder 30 by performing reflecting processing of a specular surface, etc.

In addition, in the above description, a pair of convex portions 21a and 21b is provided corresponding to the notches 31a and 31b of the support holder 30 provided at both the right and left ends, respectively. However, a configuration in which two or more notches are provided at both the right and left ends, and convex portions of a number corresponding to these notches are provided may be adopted.

Embodiment 3

Figure 15:
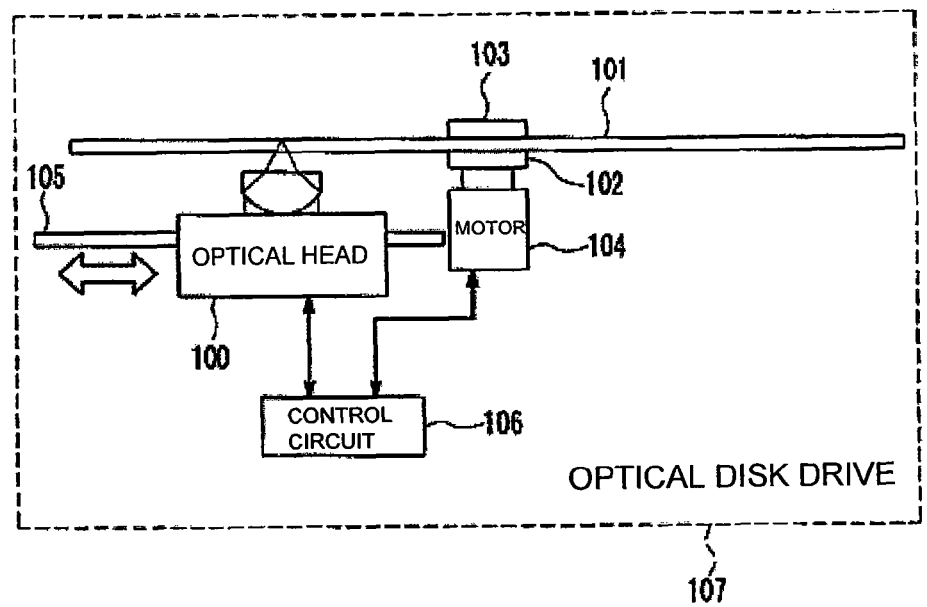
FIG. 15 is a schematic sectional view of an optical information device in Embodiment 3 of the present invention.

Moreover, an embodiment of an optical information device using the optical pickup of the present invention is shown in FIG. 15. A configuration example of a whole optical disk drive 107 serving as an optical information recording/reproducing device is shown in FIG. 15. An optical disk 101 is sandwiched and fixed by a turntable 102 and a clamper 103, and is rotated by a motor (rotational system) 104 serving as the motor of the present invention. An optical pickup 100 described in either Embodiment 1 or Embodiment 2 rides on a traverse (transfer system) 105 so that the light to be radiated can be moved from the inner periphery of the optical disk 101 to the outer periphery thereof. A control circuit 106 serving as the electric circuit of the present invention performs focus control, tracking control, traverse control, rotation control of a motor, etc. on the basis of a signal received from the optical pickup 100. Additionally, reproduction of information from a reproduction signal and delivery of a recording signal to the optical pickup 100 are performed.

Embodiment 4

Figure 16:
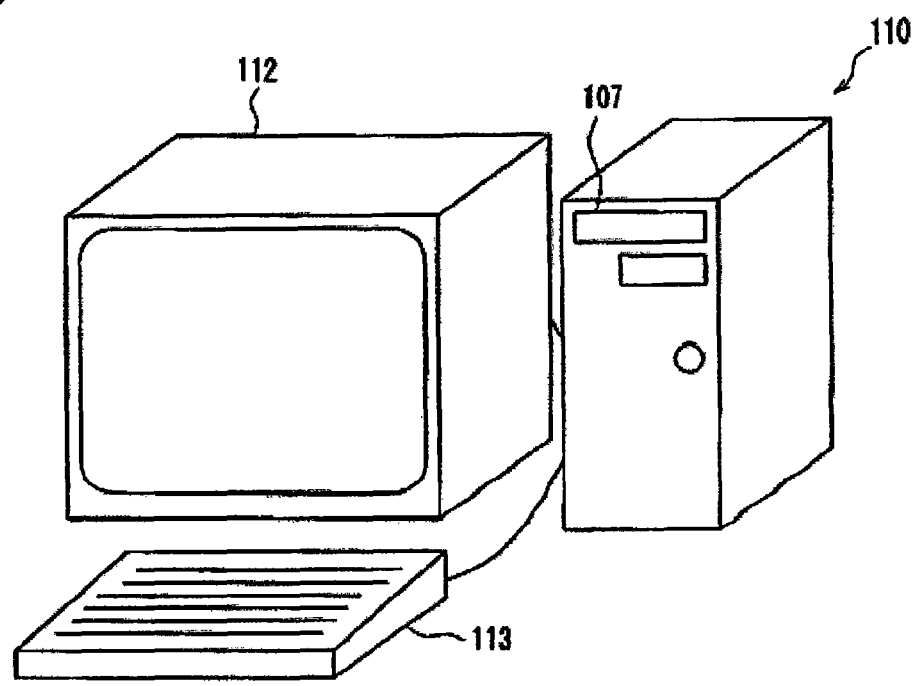
FIG. 16 is a schematic perspective view showing configuration of a computer in Embodiment 4 of the present invention.

An embodiment of a computer including the optical disk drive (optical information recording/reproducing device) described in Embodiment 3 is shown in FIG. 16.

In FIG. 16, a personal computer (computer) 110 includes the optical disk drive 107 in Embodiment 3, a keyboard 113 serving as the input device of the present invention for performing input of information, and a monitor 112 serving as the output device for performing display of information.

The computer including the optical disk drive of the above-described Embodiment 3 as an external storage device has the advantages capable of stably recording or reproducing information on or from different kinds of optical disks and performing arithmetic processing on the basis of the reproduced information, and capable of being used for a wide range of applications. In addition, an arithmetic device (CPU) for arithmetic processing (not shown) built in the personal computer 110 is equivalent to the arithmetic device of the present invention.

The optical disk drive 107 is able to take advantage of the large-capacity property thereof, thereby taking backup of a hard disk within the computer, using media (optical disks) inexpensively, and carrying the media (optical disk) easily, and is able to take advantage of its compatibility that information can be read even in other optical disk drives, thereby exchanging programs and data with people, or carrying the optical disk drive for private use. Additionally, it is also possible to cope with reproducing/recording of existing media, such as DVDs and CDs. In addition, in a case where connection with the keyboard 113 and the monitor 112 is released, an input terminal for connection with the keyboard 113 and an output terminal for connection with the monitor 112 are respectively provided as the input terminal and output terminal of the present invention on the main body of the personal computer 110.

Embodiment 5

Figure 17:
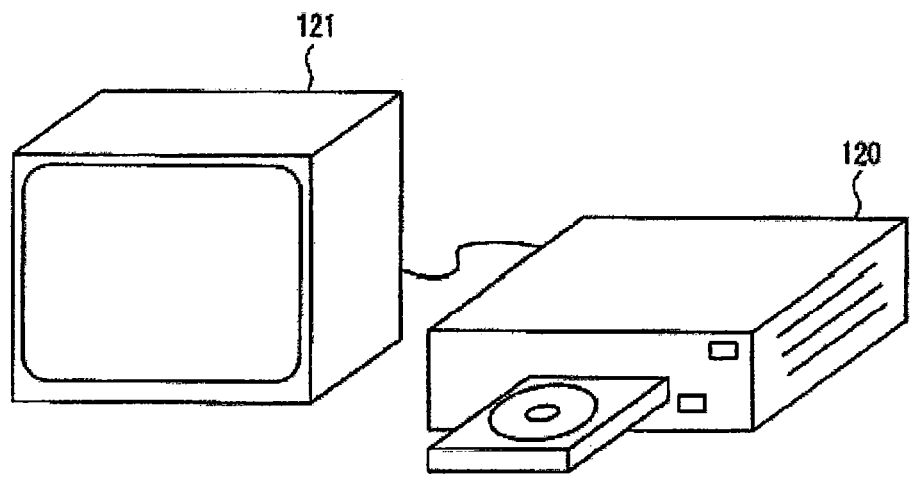
FIG. 17 is a schematic perspective view showing configuration of an optical disk recorder in Embodiment 5 of the present invention.

An embodiment of an optical disk recorder (video recording/reproducing apparatus) including the optical disk drive (optical information recording/reproducing device) described in Embodiment 3 is shown in FIG. 17.

In FIG. 17, the optical disk recorder 120 has built therein the optical disk drive 107 (not shown) in Embodiment 3, an encoder (not shown) serving as the encoder of the present invention which converts image information into information in order to perform recording on an optical disk within the optical disk drive 107, and a decoder (not shown) serving as the decoder of the present invention which converts the information within the optical disk into image information, and is used in connection with the monitor 121 for displaying recorded pictures.

The optical disk recorder 120 including the optical disk drive 107 of the above-described Embodiment 3 has the advantages capable of stably recording or reproducing pictures on or from different kinds of optical disks and is capable of being used for a wide range of applications. The optical disk recorder is able to record pictures on media (optical disk), and whenever a user wants, reproduce the pictures. In an optical disk, the operation of rewinding after recording and reproducing is unnecessary unlike a tape, and the chasing reproduction of reproducing a head portion of a certain program while the program is recorded or the simultaneous recording/reproducing of reproducing a previously recorded program while a certain program is recorded become possible. It is possible to take advantage of using media inexpensively, carrying media easily, and its compatibility in that information can be read even in other optical disk recorders, thereby exchanging recorded pictures with people, or carrying the optical disk for private use. Additionally, the optical disk recorder also copes with reproducing/recording of existing media, such as DVDs and CDs.

In addition, although the case where only an optical disk drive is provided has been described herein, a hard disk may be built in and a video recording/reproducing function of a videotape may be built in. In that case, temporary saving of pictures and backup can be performed easily.

Embodiment 6

Figure 18:
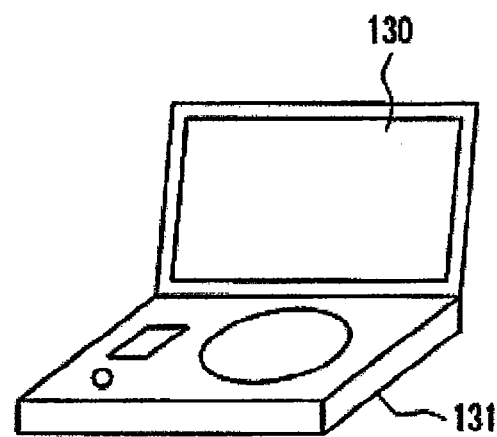
FIG. 18 is a schematic perspective view showing configuration of an optical disk player in Embodiment 6 of the present invention.

An embodiment of an optical disk player (video reproducing apparatus) including the optical disk drive (optical information recording/reproducing device) described in Embodiment 3 is shown in FIG. 18.

In FIG. 18, an optical disk player 131 including an LCD monitor 130 has built therein the optical disk drive 107 (not shown) in Embodiment 3, and a decoder (not shown) serving as the decoder of the present invention which converts the information within an optical disk into image information, and is able to display the picture recorded on the optical disk on the LCD monitor 130. The optical disk player including the optical disk drive 107 of the above-described Embodiment 3 has the advantages capable of stably reproducing pictures from different kinds of optical disks and capable of being used for a wide range of applications.

The optical disk player is able to reproduce pictures recorded on media (optical disk), whenever a user wants. In an optical disk, the operation of rewinding after reproducing is unnecessary unlike a tape, and it is possible to make an access to an arbitrary location of a certain picture to reproduce the picture. Additionally, the optical disk player also copes with reproducing of existing media, such as DVDs and CDs.

Embodiment 7

Figure 19:
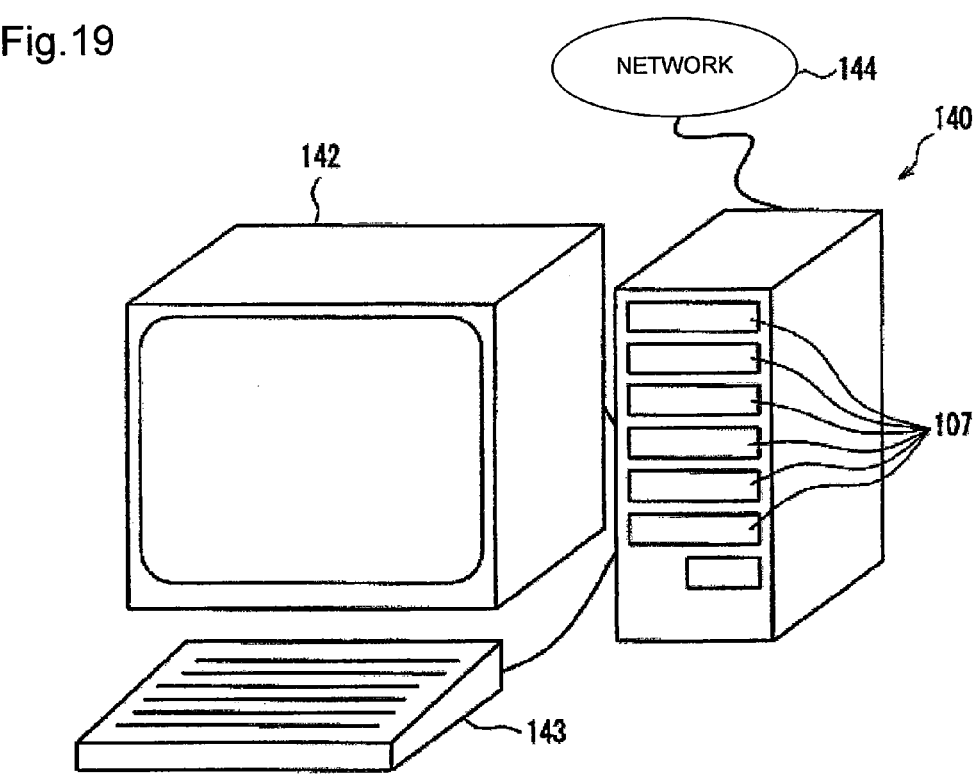
FIG. 19 is a schematic perspective view showing configuration of an optical disk server in Embodiment 7 of the present invention.

An embodiment of an optical disk server including the optical disk drive (optical information recording/reproducing device) described in Embodiment 3 is shown in FIG. 19.

In FIG. 19, the optical disk server 140 includes the optical disk drive 107 in Embodiment 3, a monitor 142 for displaying information, and a keyboard 143 for performing input of information, and is connected with a network 144 via an interface (not shown) serving as the input/output terminal of the present invention.

The optical disk server 140 including the optical disk drive 107 of the above-described Embodiment 3 as an external storage device has the advantages capable of stably recording or reproducing information on or from different kinds of optical disks and capable of being used for a wide range of applications. The optical disk drive takes advantage of the large-capacity property thereof, thereby sending out information (such as images, voices, pictures, HTML documents, and text documents) recorded on an optical disk according to the request from the network 144. Additionally, the optical disk drive records information sent from the network on a requested location. Additionally, since information recorded on existing media, such as DVDs and CDs, can also be reproduced, it is also possible to send out the information.

Embodiment 8

Figure 20:
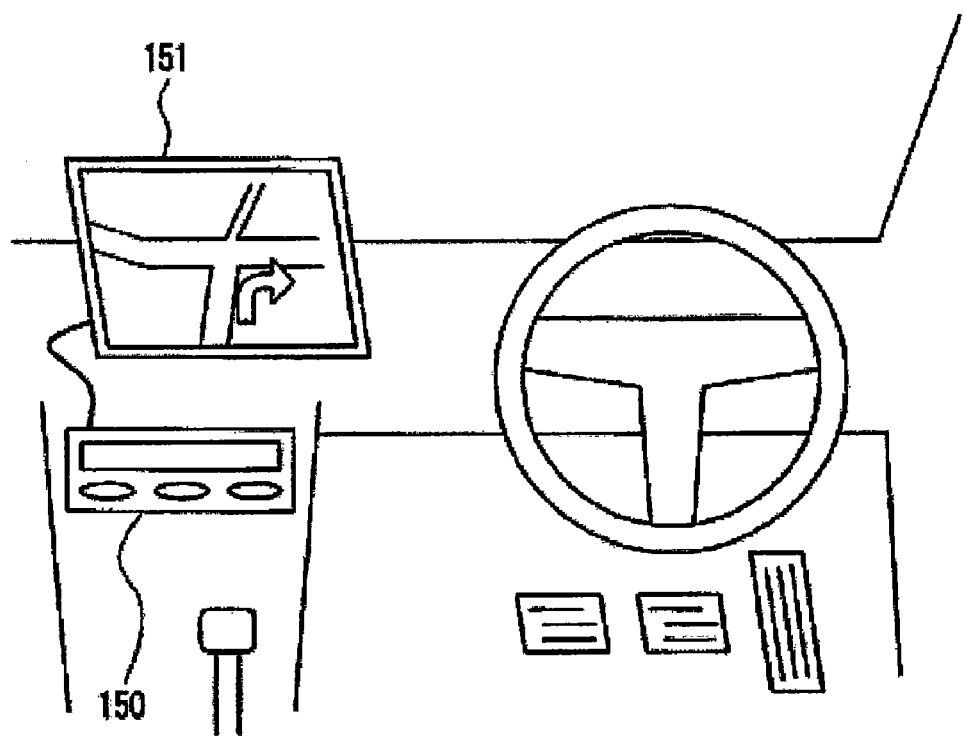
FIG. 20 is a schematic perspective view showing configuration of a car navigation system in Embodiment 8 of the present invention.

An embodiment of a car navigation system including the optical disk drive (optical information recording/reproducing device) described in Embodiment 3 is shown in FIG. 20.

In FIG. 20, the car navigation system 150 has built therein the optical disk drive 107 (not shown) in Embodiment 3 and an decoder (not shown) serving as the decoder of the present invention which converts the information within the optical disk into image information, and is used in connection with an LCD monitor 151 for performing display of topography or destination information.

The car navigation system including the optical disk drive 107 of the above-described Embodiment 3 has the advantages capable of stably recording or reproducing pictures on or from different kinds of optical disks and capable of being used for a wide range of applications. The car navigation system 150 plots the current position on the basis of map information recorded on media (optical disk), and the information of a global positioning system (GPS), a gyroscope, a speedometer, an odometer, etc., and displays the position on an LCD monitor. Additionally, when a destination is input, an optimal path to the destination is plotted on the basis of map information or road information, and is displayed on the LCD monitor.

By using a large-capacity optical disk in order to record map information, one disk can cover a wide area and provide detailed road information. Additionally, information on restaurants, convenience stores, gas stations, etc. which pertain to the vicinities of roads can also be simultaneously stored on the optical disk, and can be provided. Moreover, as time goes by, the road information becomes old and does not match reality. However, since optical disks are compatible and media are inexpensive, the newest information can be obtained by replacing an old optical disk with a disk on which new road information is stored. Additionally, since the car navigation system copes with reproducing/recording of existing media, such as DVDs and CDs, it is also possible to see a film in an automobile or to listen to music.

INDUSTRIAL APPLICABILITY

The present invention has the advantages that excellent signal characteristics can be obtained for optical disks on and/or from which recording and/or reproduction are performed using a laser, and can be utilized in the broad industrial field from computers to AV equipment utilizing optical disks, and the industrial applicability thereof is very wide and great.

The invention claimed is:

1. An optical pickup comprising:
an optical component;
a support holder for holding said optical component; and
an optical base for fixing said support holder,
wherein said optical base has a plurality of convex portions,
said optical base and said support holder are fixed by photo-curable adhesives for adhering said convex portions and said support holder to each other, and
a height of said convex portions is a height such that said convex portions do not protrude from said support holder in a direction of an optical axis of a beam which enters said optical component.

2. The optical pickup according to claim 1,
wherein said support holder has at least one concave portion at its ends.

3. The optical pickup according to claim 1,
wherein application positions of said photo-curable adhesives are symmetrical to each other in a vertical direction and a horizontal direction about center of a light-receiving region of said optical component.

4. The optical pickup according to claim 2,
wherein said concave portions of said support holder form notches which pass through both surfaces of said support holder.

5. The optical pickup according to claim 2,
wherein said concave portions of said support holder are formed only in a surface side of said support holder which faces said convex portions.

6. The optical pickup according to claim 1,
wherein said convex portions are hidden inside an external shape of said support holder in a projection view seen from a drawing direction of said convex portion.

7. The optical pickup according to claim 1,
wherein said convex portions have grooves or banks provided along a drawing direction from said surface of said optical base.

8. The optical pickup according to claim 1,
wherein said convex portions are formed from a transparent material.

9. The optical pickup according to claim 2,
wherein said convex portions are formed from a transparent material,
faces of said concave portions which faces said convex portions are subjected to reflecting processing.

10. The optical pickup according to claim 1,
wherein said adhesive has a viscosity of 20000 mPa·s or more in a gel state during non-curing.

11. The optical pickup according to claim 1,
wherein hardness of said adhesive after curing is equal to or greater than 60 and equal to or less than 90 in Shore D scales.

12. The optical pickup according to claim 1,
wherein said optical component is an optical detector which receives a light beam emitted from a light source and reflected by an optical disk.

13. An optical information device comprising:
said optical pickup according to claim 1,
a motor which turns an optical disk, and
an electric circuit which receives a signal obtained from said optical pickup, and controls or drives said motor and said optical pickup on said basis of said signal.

14. A computer comprising:
the optical information device according to claim 13,
an input device or input terminal for inputting information,
an arithmetic device which performs calculation on said basis of information input from said input device or input terminal, or information reproduced from said optical information device, and
an output device or output terminal for displaying or outputting said information input from said input device or input terminal, said information reproduced from said optical information device, or results calculated by said arithmetic device.

15. An optical disk player comprising:
the optical information device according to claim 13, and
a decoder from information to an image, which converts an information signal obtained from said optical information device into an image.

16. A car navigation system comprising:
the optical information device according to claim 13, and
a decoder from information to an image, which converts an information signal obtained from said optical information device into an image.

17. An optical disk recorder comprising:
the optical information device according to claim 13, and
an encoder from said image to information, which converts image information into information to be recorded by said optical information device.

18. An optical disk server comprising:
the optical information device according to claim 13, and
an input/output terminal which performs exchange of information with outside.

\* \* \* \* \*